US008081815B2

(12) United States Patent
Kotake et al.

(10) Patent No.: US 8,081,815 B2
(45) Date of Patent: Dec. 20, 2011

(54) MARKER ARRANGEMENT INFORMATION MEASURING APPARATUS AND METHOD

(75) Inventors: Daisuke Kotake, Yokohama (JP); Kazuki Takemoto, Kawasaki (JP); Kenji Morita, Yokohama (JP); Sonoko Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1152 days.

(21) Appl. No.: 11/836,085

(22) Filed: Aug. 8, 2007

(65) Prior Publication Data

US 2008/0285854 A1 Nov. 20, 2008

(30) Foreign Application Priority Data

Aug. 11, 2006 (JP) ................................ 2006-219845
May 17, 2007 (JP) ................................ 2007-131573

(51) Int. Cl.
*G06K 9/00* (2006.01)
(52) U.S. Cl. ..................................................... 382/154
(58) Field of Classification Search ........................ None
See application file for complete search history.

(56) References Cited

U.S. PATENT DOCUMENTS

| 6,311,108 B1 * | 10/2001 | Ammar et al. .................. 701/16 |
| 2004/0220767 A1 * | 11/2004 | Tanaka et al. .................. 702/127 |
| 2005/0253870 A1 * | 11/2005 | Kotake et al. .................. 345/633 |

FOREIGN PATENT DOCUMENTS

| JP | 07-037056 A | 2/1995 |
| JP | 11-084307 A | 3/1999 |
| JP | 2000-041173 A | 2/2000 |
| JP | 2006-087083 A | 3/2006 |
| WO | 2005/010817 A1 | 2/2005 |

OTHER PUBLICATIONS

R. M. Haralick, C. Lee, K. Ottenberg, and M. Nolle: "Review and Analysis of Solutions of the Three Point Perspective Pose Estimation Problem", International Journal of Computer Vision, vol. 13, No. 3, pp. 331-356, 1994.
H. Kato, M. Billinghurst, K. Asano, and K. Tachibana: "An Augmented Reality System and its Calibration based on Marker Tracking", Transactions of Virtual Reality Society of Japan, vol. 4, No. 4, pp. 607-616, 1999.
State, G. Hirota, D. T. Chen, W. F. Garrett and M. A. Livingston: "Superior Augmented Reality Registration by Integrating Landmark Tracking and Magnetic Tracking", Proc. SIGGRAPH '96, pp. 429-438, 1996.
G. Baratoff, A. Neubeck and H. Regenbrecht: "Interactive Multi-Marker Calibration for Augmented Reality Applications", Proc. ISMAR 2002, pp. 107-116, 2002.
Daniel F. Abawi, Joachim Bienwald, Ralf Dorner: "Accuracy in Optical Tracking with Fiducial Markers: An Accuracy Function for AR Tool Kit", Proc. ISMAR 2004, pp. 260-261, 2004.
D. G. Lowe, "Fitting Parameterized Three-Dimensional Models to Images", IEEE Transactions on Pattern Analysis and Machine Intelligence, vol. 13, No. 5, pp. 441-450, 1991.

* cited by examiner

*Primary Examiner* — Brian Werner

(57) ABSTRACT

A marker arrangement information measuring apparatus includes an image acquiring unit configured to acquire a captured image, a marker detecting unit configured to detect markers from the captured image, a marker identifying unit configured to identify the marker detected by the marker detecting unit, an arrangement information calculating unit configured to calculate arrangement information of the marker based on an identification result of the marker identifying unit, an analyzing unit configured to analyze the identification result of the marker identifying unit, and a display unit configured to display an image corresponding to an analysis result of the analyzing unit on the captured image in a combined manner, thus presenting the analysis result to a user.

17 Claims, 20 Drawing Sheets

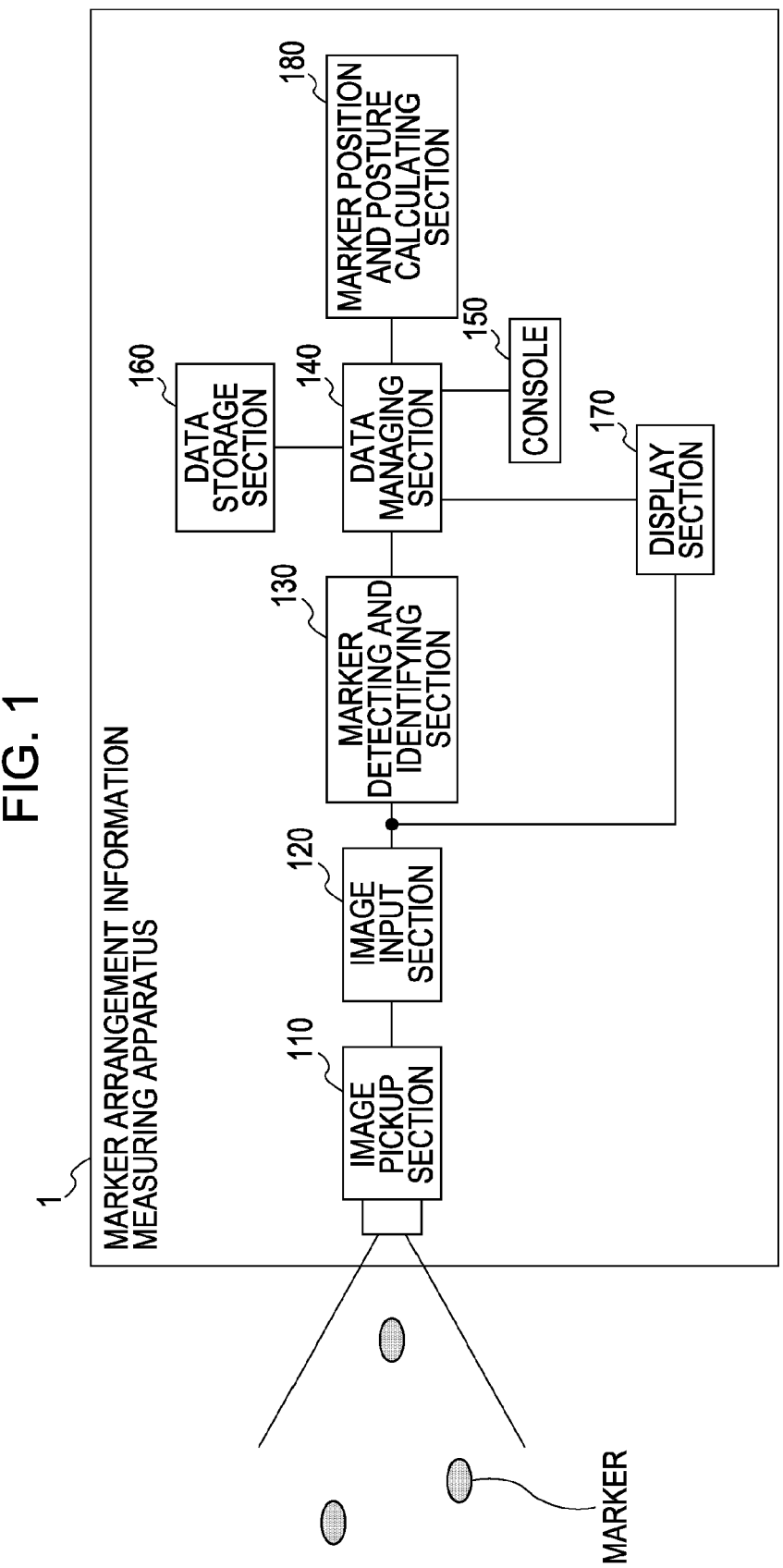

ORIENTATION DECISION REGION
BIT REGION
BOUNDARY REGION

CENTER
MARKER COORDINATE SYSTEM
REFERENCE COORDINATE SYSTEM

CAPTURED IMAGE

DISPLAYED IMAGE

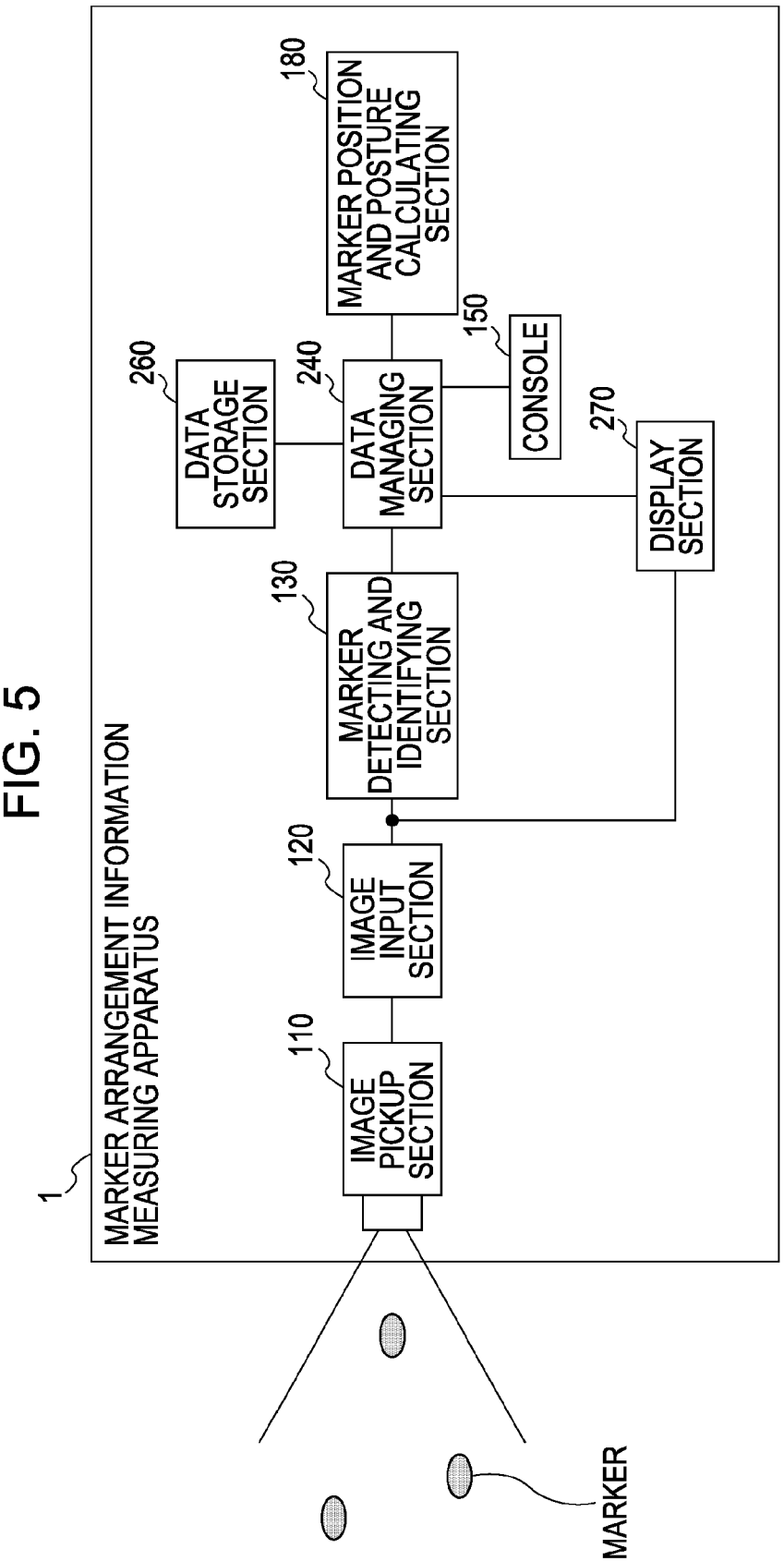

CAPTURED IMAGE

DISPLAYED IMAGE

DIRECTION IN WHICH
IMAGE HAS BEEN
CAPTURED IN THE PAST

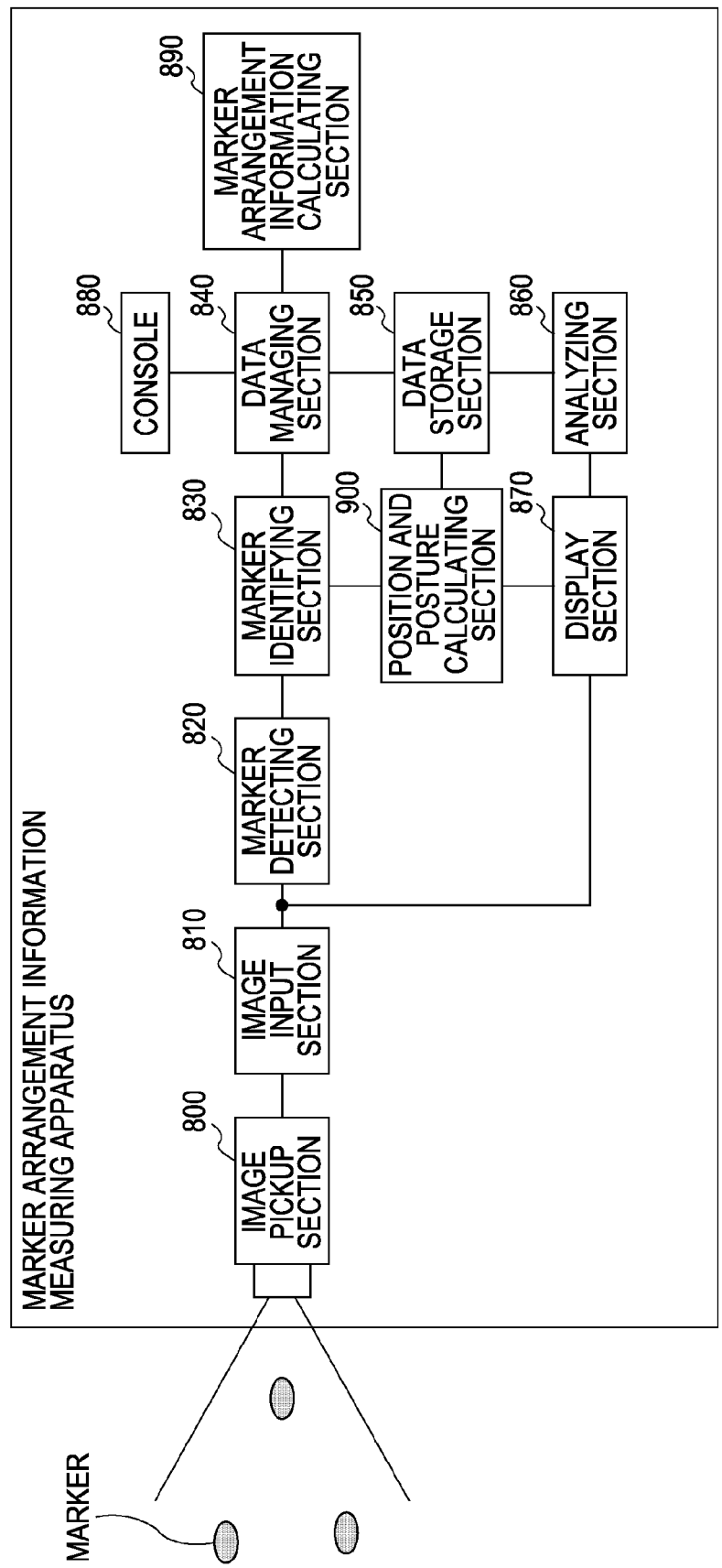

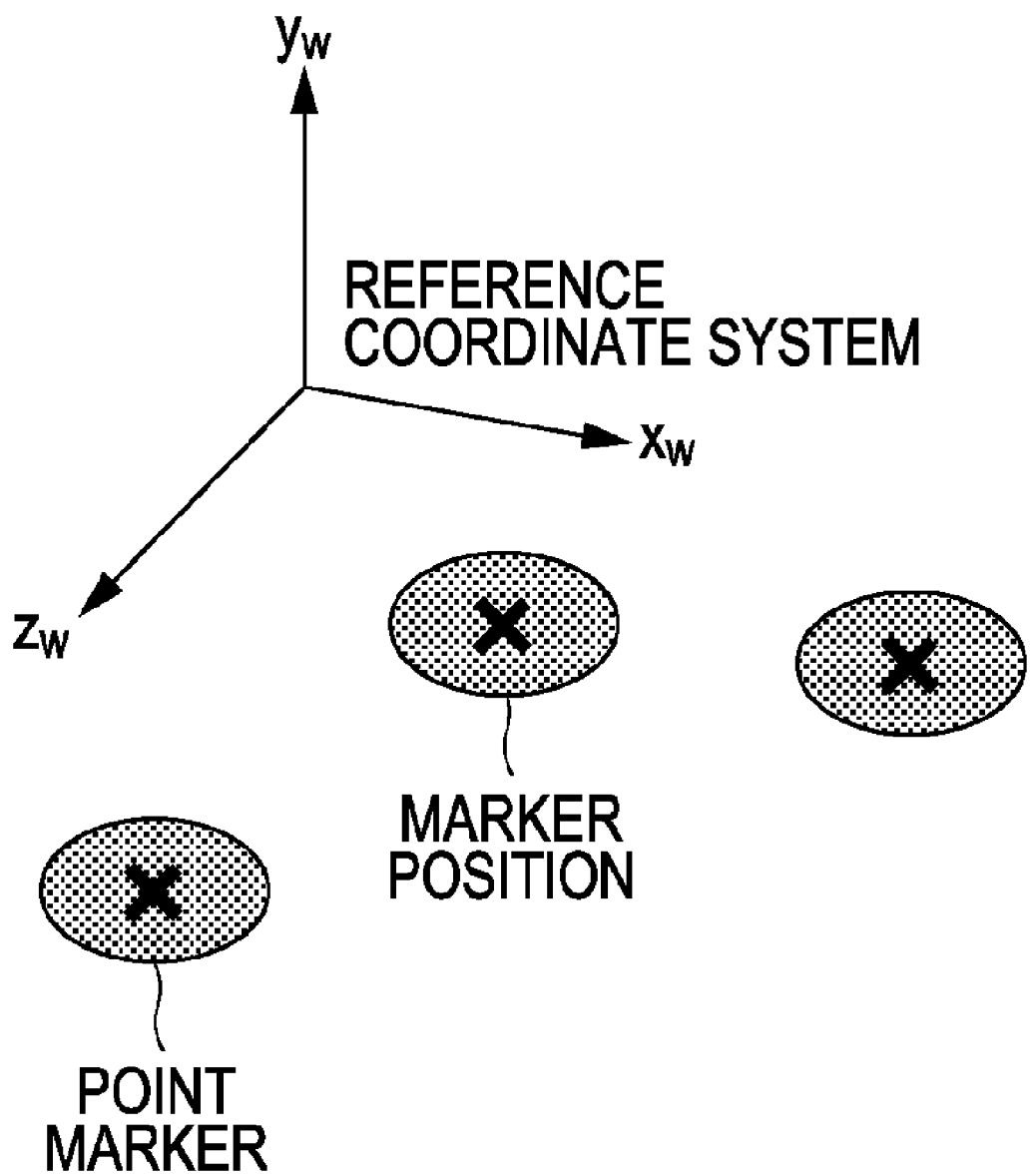

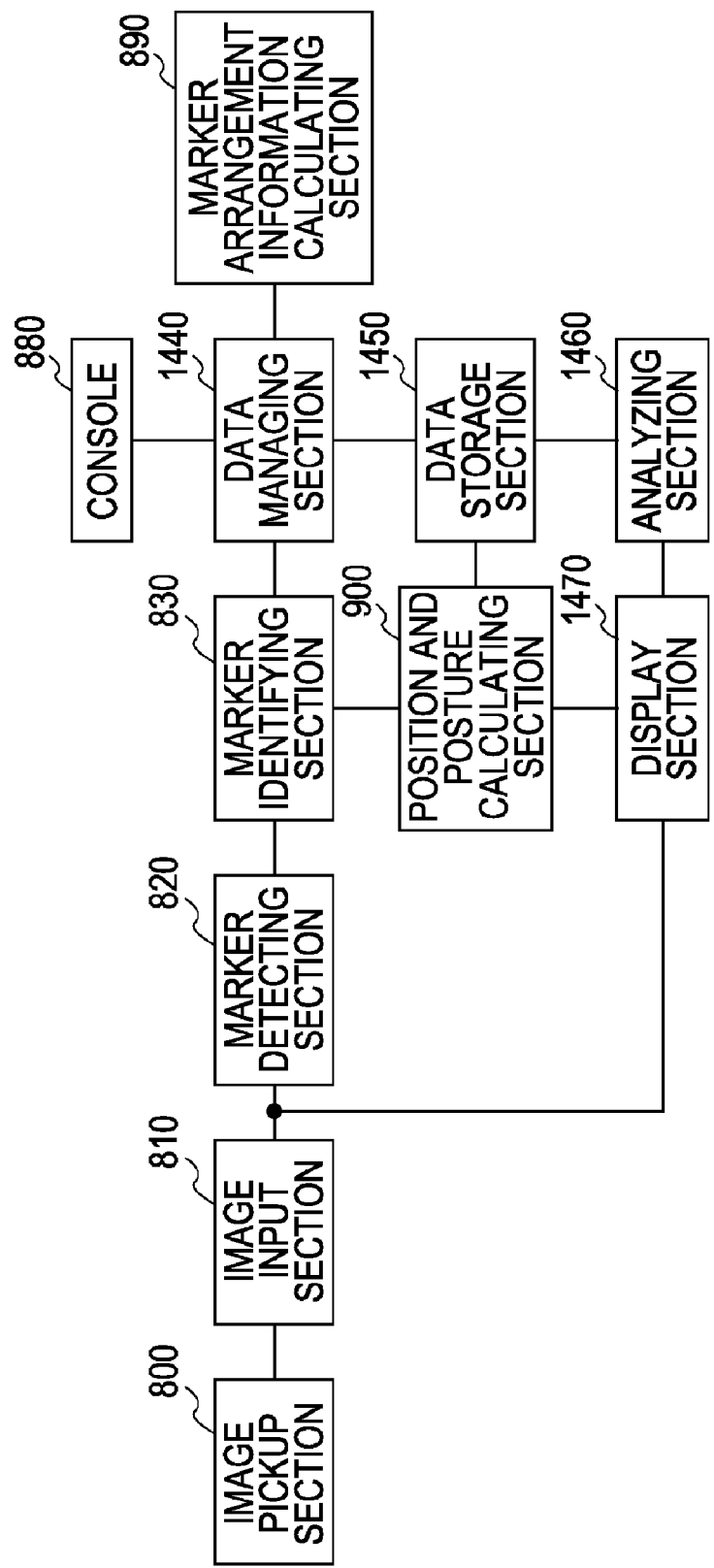

MARKER ARRANGEMENT INFORMATION MEASURING APPARATUS AND METHOD

BACKGROUND OF THE INVENTION

1. Field of the Invention

The present invention relates to processing to obtain arrangement information for each of markers arranged in a three-dimensional space.

2. Description of the Related Art

Recently, research of Mixed Realty (MR) technology has been developed. The MR technology is intended to merge a physical space and a virtual space, which is created by a computer, with each other without including seams. Of the MR technology, Augmented Reality (AR) technology for displaying the virtual space in a superimposed relation to the physical space has particularly received attention.

There are two types of image display apparatus for use in the AR technology, i.e., the video see-through type and the optical see-through type. In the image display apparatus of the video see-through type, a combined image is displayed by drawing, on an image of a physical space captured by an image pickup apparatus, an image of a virtual space produced depending on the position and the posture of the image pickup apparatus (such as character information and a virtual object drawn using computer graphics) in a superimposed manner. In the image display apparatus of the optical see-through type, an image of a virtual space produced depending on the position and the posture of an observer's viewpoint is displayed on an optical see-through display attached to the observer's head.

The AR technology is expected to be usefully employed in various fields including a surgical aid to display a situation inside the body of a patient on the body surface of the patient in a superimposed manner, simulation of building construction to display a virtual building on vacant land in a superimposed manner, and an assembly aid to display operation procedures and layouts of wiring in assembly work.

One of the most important problems to be overcome in the AR technology is how precisely the physical space and the virtual space are registered with each other, and a variety of approaches have been proposed so far. The problem of registration in the AR technology is equivalent to, in the video see-through type, a problem of precisely determining the position and the posture of the image pickup apparatus in a scene (i.e., in a reference coordinate system defined in the scene). Also, the problem of registration in the AR technology is equivalent to, in the optical see-through type, a problem of precisely determining the viewpoint of the observer or the position and the posture of the display in a scene.

As one method for overcoming the problem of registration in the AR technology of the video see-through type, it is generally performed to determine the position and the posture of a measurement target by using a plurality of markers arranged in a scene. More specifically, the position and the posture of the image pickup apparatus in the reference coordinate system are determined based on the correspondent relationship between a projected position of each marker in a captured image and a marker position in the reference coordinate system, the latter being known information.

Also, according to one method for overcoming the problem in the AR technology of the optical see-through type, the image pickup apparatus is attached to the measurement target (i.e., the observer's head or the display). Further, the position and the posture of the image pickup apparatus are determined in a similar manner to that in the video see-through type.

In the field of photo survey, the method of determining the position and the posture of the image pickup apparatus based on the correspondent relationship between the projected image of the marker on the captured image and the three-dimensional position of the marker is described, for example, in R. M. Haralick, C. Lee, K. Ottenberg, and M. Nolle: "Review and Analysis of Solutions of the Three Point Perspective Pose Estimation Problem", International Journal of Computer Vision, vol. 13, No. 3, PP. 331-356, 1994. It is also proposed to optimize the position and the posture of the image pickup apparatus by using, as an initial value, the position and the posture of the image pickup apparatus which are determined based on the projected image of the marker on the captured image as described above. The optimization is performed by repetitive calculations executed so as to minimize an error between the actually observed position of the projected image of the marker on the captured image and the calculated position of the projected image, i.e., an error between the three-dimensional position of the marker and the position of the projected image calculated from the position and the posture of the image pickup apparatus. Such a method is described, for example, in H. Kato, M. Billinghurst, K. Asano, and K. Tachibana: "An Augmented Reality System and its Calibration based on Marker Tracking", Transactions of Virtual Reality Society of Japan, Vol. 4, No. 4, PP. 607-616, 1999. Thus, by using the above-mentioned methods, the position and the posture of the image pickup apparatus have been determined so far based on the image captured by the image pickup apparatus.

On the other hand, as described in, e.g., Japanese Patent Laid-Open No. 11-084307, Japanese Patent Laid-Open No. 2000-041173, and A. State, G. Hirota, D. T. Chen, W. F. Garrett and M. A. Livingston: "Superior Augmented Reality Registration by Integrating Landmark Tracking and Magnetic Tracking", Proc. SIGGRAPH '96, PP. 429-438, 1996, there is known a method of attaching a position and posture sensor having 6 degrees of freedom, e.g., a magnetic sensor or an ultrasonic sensor, to the image pickup apparatus which is a measurement target, and measuring the position and the posture of the image pickup apparatus in combination with the above-described detection of the marker based on image processing. Because an output value of the sensor can be stably obtained in spite of accuracy being changed depending on a measurement range, the method using the sensor and the image processing in a combined manner is more robust than the method using only the image processing. In Japanese Patent Laid-Open No. 2000-041173, the position and the posture of the image pickup apparatus are obtained by using, as an initial value, the position and the posture of the image pickup apparatus obtained from the position and posture sensor having 6 degrees of freedom, and by minimizing the error between the observed position and the calculated position of the marker on the projected image of the marker on the captured image through repetitive calculations.

The above-described registration method using the marker requires the following information in order to determine the position and the posture of the image pickup apparatus, as the measurement target, in the reference coordinate system. For example, in the case of a point-like marker (hereinafter referred to as a "point marker") in the form of a circular area located in a space and filled in with a single color, the position of the center of gravity of the point marker in the reference coordinate system and the posture of the marker with respect to the reference coordinate system are required to be known. In the case of the marker having a polygonal shape, e.g., a triangular or square shape, the position of the center of gravity of the marker in the reference coordinate system and the posture of the marker with respect to the reference coordinate system are required to be known. When the polygonal marker, e.g., a square marker, is employed, the marker is itself used as a reference for a coordinate system without separately setting the reference coordinate system in many cases. However, when a plurality of polygonal markers are used, the reference coordinate system is required because the relative relationships among the positions and the postures of those polygonal markers are required to be known.

Although the position and the posture of the marker can be measured by hand work using a tape measure and a protractor or a measuring instrument, the measurement is usually performed by utilizing an image in consideration of that the hand work accompanies the problem of accuracy and the need of time and effort. The position of the point marker can be measured by the so-called bundle adjustment method. According to the bundle adjustment method, the position of the point marker is measured through the following processing. Many images of the point marker are captured by an image pickup apparatus. The position of the point marker and the position and the posture of the image pickup apparatus are repeatedly calibrated so that an error between the observed position of a projected image of the point marker on each captured image and the calculated position of the projected image of the point marker (i.e., a projection error) is minimized, the latter being calculated based on the three-dimensional position of the point marker and the position and the posture of the image pickup apparatus.

Further, G. Baratoff, A. Neubeck and H. Regenbrecht: "Interactive Multi-Marker Calibration for Augmented Reality Applications", Proc. ISMAR 2002, PP. 107-116, 2002 (hereinafter "Baratoff et al.") describes a method of measuring the positions and the postures of many square markers arranged in a three-dimensional space. According to the method described in Baratoff et al, images of the many square markers arranged in the three-dimensional space are captured in large number. The position and the posture of the image pickup apparatus used to capture each image and the positions and the postures of the square markers are determined through repetitive calculations so that a projection error of each square marker image is minimized.

When the method of measuring the position of the point marker is performed using the above-described bundle adjustment method, the accurate position and posture cannot be determined unless at least two images are captured for each marker. In the case of the point marker, if only one image of the point marker is captured, a linear line containing the point marker in the three-dimensional space is decided and the position of the image pickup apparatus in the direction of depth looking from an observer is not definite. Further, when the measurement of the position and the posture is performed for the square marker, the following tendency is also resulted similarly to the case of the point marker. As the number of the captured images increases, an error is distributed to a larger number of images, and the position and the posture of the marker can be measured with higher accuracy than when a smaller number of images are captured. It is therefore desired that the image of the marker for which the position and the posture are to be determined is captured as many times as possible.

In the known marker measurement, however, there is no method of enabling an observer to confirm information regarding how many times each marker image has been captured up to that time while observing the image captured by the image pickup apparatus.

The position and the posture of the marker can be measured with higher accuracy by, in addition to increasing the number of captured images, observing the marker from directions in larger number instead of one direction.

In the known marker measurement, however, there is no method of enabling an observer to confirm information regarding in which directions each marker image has been captured up to that time while observing the image captured by the image pickup apparatus.

SUMMARY OF THE INVENTION

In view of the above-described state of the art, when a marker image is captured by an image pickup apparatus to measure the position and the posture of each marker, the present invention gives an operator information regarding how many times the marker image has been captured up to that time, while the operator observes the image captured by the image pickup apparatus, thus enabling the operator to confirm for which marker the number of captured images is deficient and which marker image is to be captured next.

Also, when a marker image is captured by an image pickup apparatus to measure the position and the posture of each marker, the present invention gives an operator information regarding in which directions the marker image has been captured up to that time, while the operator observes the image captured by the image pickup apparatus, thus enabling the operator to confirm the direction in which the number of times of the image capturing of each marker is deficient and in which direction the image of each marker is to be next captured.

According to an aspect of the present invention, a marker arrangement information measuring apparatus includes an image acquiring unit configured to acquire an image captured by an image pickup apparatus, a marker detecting unit configured to detect markers from the captured image, a marker identifying unit configured to identify the marker detected by the marker detecting unit, an arrangement information calculating unit configured to calculate arrangement information of the marker based on an identification result of the marker identifying unit, an analyzing unit configured to analyze the identification result of the marker identifying unit, and a display unit configured to display an image corresponding to an analysis result of the analyzing unit on the captured image in a combined manner.

Further features of the present invention will become apparent from the following description of exemplary embodiments with reference to the attached drawings.

BRIEF DESCRIPTION OF THE DRAWINGS

FIG. 1 is a block diagram showing the functional configuration of a marker arrangement information measuring apparatus according to a first exemplary embodiment.

FIG. 5 is a block diagram showing the functional configuration of a marker arrangement information measuring apparatus according to a second exemplary embodiment.

FIG. 8 is a block diagram showing the functional configuration of a marker arrangement information measuring apparatus according to a third exemplary embodiment.

FIG. 9 illustrates point markers used in the third exemplary embodiment.

FIG. 14 is a block diagram showing the functional configuration of a marker arrangement information measuring apparatus according to a fourth exemplary embodiment.

DESCRIPTION OF THE EMBODIMENTS

First Exemplary Embodiment

Figure 2A:
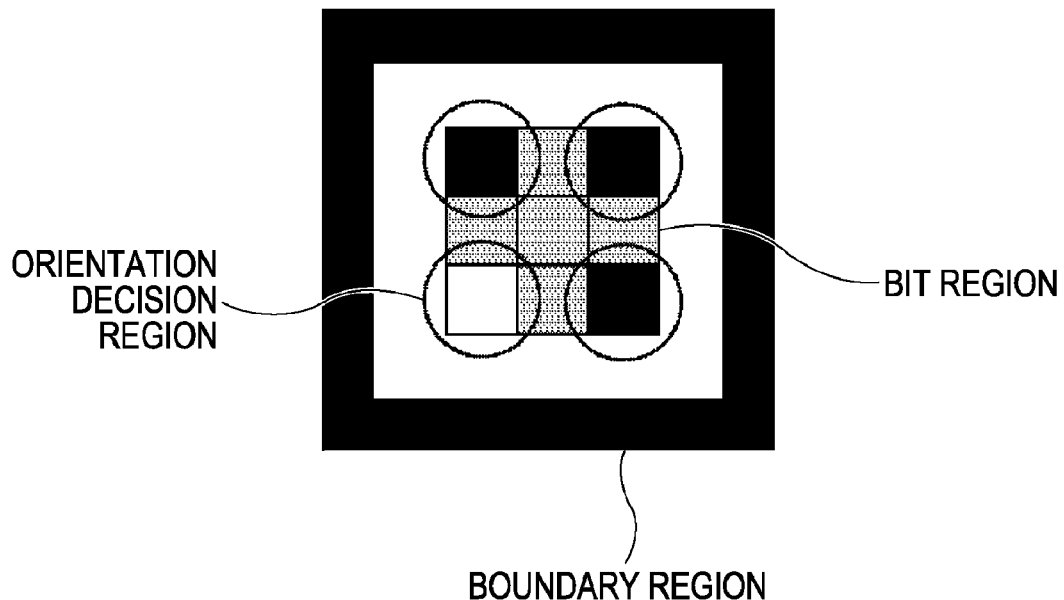
FIGS. 2A and 2B illustrate a marker used in the first exemplary embodiment.

FIG. 1 is a block diagram showing the functional configuration of a marker arrangement information measuring apparatus 1 according to a first exemplary embodiment. An image pickup section 110 is constituted by a video camera and captures an image of a scene or an object on which markers are arranged. An image input section 120 takes the image captured by the image pickup section 110 into a computer. A marker detecting and identifying section 130 detects each marker from the image taken into the computer by the image input section 120 and identifies the detected marker. A data managing section 140 receives a marker detection result from the marker detecting and identifying section 130. When an instruction for acquiring the image captured by the image pickup section (apparatus) at the current time is input as a command entered through a console 150, the data managing section 140 stores, in a data storage section 160, the marker detection result input from the marker detecting and identifying section 130. A display section 170 displays the image taken in by the image input section 120. Further, when an instruction for calculating marker arrangement information, i.e., the position and the posture of each marker, is input through the console 150, the data managing section 140 outputs, to a marker position and posture calculating section 180, the marker detection result stored in the data storage section 160. The marker position and posture calculating section 180 calculates the position and the posture of the marker based on the marker detection result.

Figure 2B:
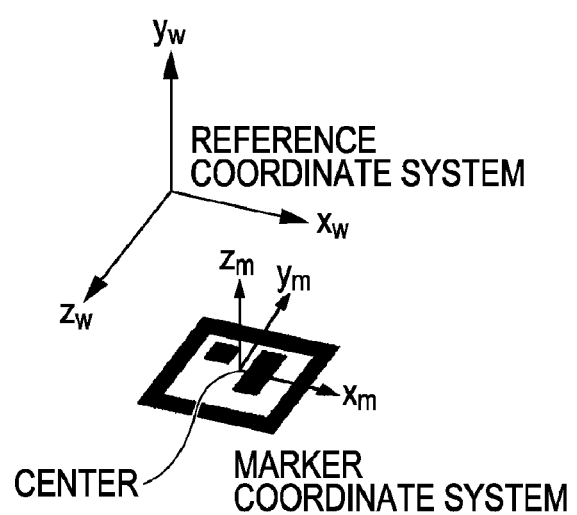

The marker used in the first exemplary embodiment is described next. FIGS. 2A and 2B illustrate the marker used in the first exemplary embodiment. In this first exemplary embodiment, a marker having a square shape (hereinafter referred to as a "square marker"), shown in FIG. 2A, is used as a target for calibration of the marker arrangement information. As shown in FIG. 2A, the square marker is made up of a boundary region (black frame) indicating the presence of a marker region, and an inner region surrounded by the black frame. The inner region is divided into five parts at equal intervals in each of the vertical and horizontal directions as viewed on the drawing, and an inner (3×3) region represents the orientation and the specific identifier of the square marker. More specifically, four corners of the (3×3) region (i.e., regions surrounded by four circles in FIG. 2A) represent the orientation of the square marker. Note that the four circles in FIG. 2A are shown merely for the sake of explanation and they are not actually included in the square marker. Three of the four corners are filled in with black, and the remaining one is filled in with white. The four corners filled in with black or white represent the orientation of the square marker. The identifier of the square marker is represented by five regions of the (3×3) regions except for the four corners (i.e., five regions hatched in FIG. 2A). It is assumed that each of the five regions represents 0 when the relevant region is filled in with white and 1 when the relevant region is filled in with black. In other words, the square marker can represent the identifier in 5 bits, i.e., 32 kinds of identifiers.

FIG. 2B illustrates the arrangement information of the square marker. The arrangement information of the square marker is represented by the position and the posture of the square marker with respect to a reference coordinate system. In this first exemplary embodiment, the position of the square marker is given by the position of a center of the square shape (i.e., a crossed point of diagonals) and is represented by a three-dimensional vector $t_{wm}$ with respect to the reference coordinate system. The posture of the square marker is given by its posture with respect to the reference coordinate system when a coordinate system of the square marker (i.e., a marker coordinate system) is defined as shown in FIG. 2B. Because the degree of freedom of the posture is 3, the posture of the square marker is represented by a three-dimensional vector $\omega_{wm}$.

An outline of the operation of the marker arrangement information measuring apparatus 1 according to the first exemplary embodiment will be described below.

The video camera constituting the image pickup section 110 outputs a motion image to the image input section 120 regardless of the operation of a user. The display section 170 displays the motion image input to the image input section 120 on a screen at any time the user desires. Therefore, the user can always confirm, on the screen, the image captured by the video camera. The user captures the image of the scene or the object on which the markers are arranged while freely moving the video camera.

The marker detecting and identifying section 130 detects each marker contained in the image which has been input to the image input section 120, and identifies the detected marker. In order to detect the above-described square marker from the input image, the marker detecting and identifying section 130 executes a binarization process and a labeling process on connected areas in the input image, thus extracting the inner region surrounded by the black frame that represents the boundary region of the square marker. Further, the marker detecting and identifying section 130 executes line fitting on the inner region of the square marker and determines the image coordinates of four apexes of the square defining the inner region. In addition, the marker detecting and identifying section 130 executes two-dimensional projective transformation to transform the square marker on the input image into an orthogonally projected image, and reads the orientation decision region and the bit region, thus reading and identifying the identifier of the square marker.

The data managing section 140 receives the marker detection result from the marker detecting and identifying section 130. As described above, when the instruction for calculating the marker arrangement information, i.e., the position and the posture of each marker, is input as a command through the console 150 by the user, the marker detection result input from the marker detecting and identifying section 130 is stored in the data storage section 160. Accordingly, the data storage section 160 stores the marker detection results for a plurality of images. The marker detection results are each stored in a set of the image number, the marker identifier, and the image coordinates of four apexes of the square defining the inner region of the marker.

Figure 3A:
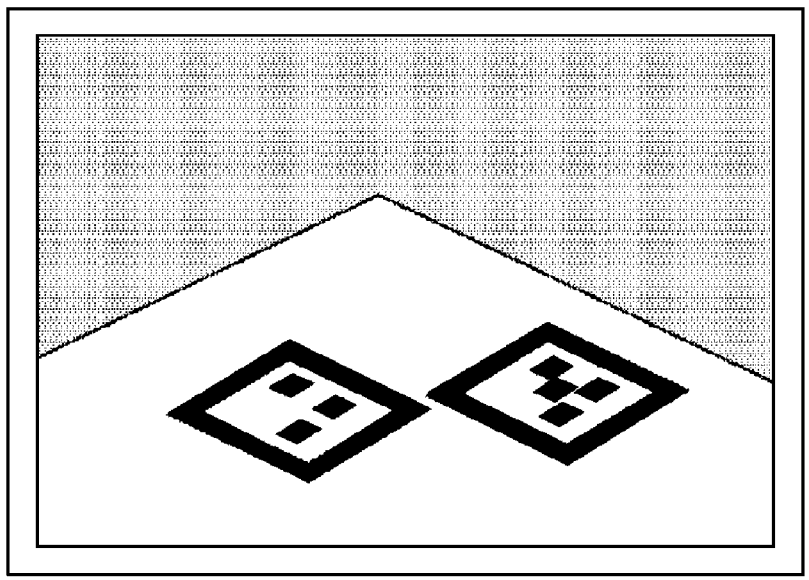
FIGS. 3A and 3B illustrate a method of presenting the number of times at which an image of each marker has been captured.
Figure 3B:
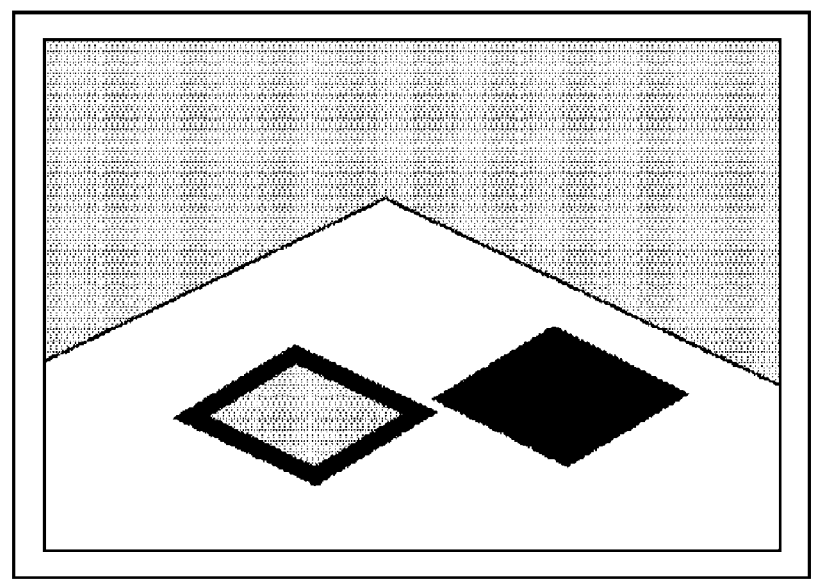

The display section 170 displays the image input to the image input section 120 on the screen at any time the user desires. On that occasion, the data managing section 140 refers to the data storage section 160 with respect to the marker which has been detected and identified in the latest image. Further, the data managing section 140 counts the number of data detected for the relevant marker and stored in the data storage section 160, i.e., the number of times at which the image of the relevant marker has been captured up to that time. The counted number is presented to the user in different manners depending on the case where the number of times of the image capturing is two or more and the case where the number of times of the image capturing is less than two. FIGS. 3A and 3B illustrate a method of presenting the number of times at which the image of each marker has been captured. FIG. 3A illustrates the image which is captured by the image pickup apparatus and is input to the image input section 120. In FIG. 3A, it is assumed that the number of times of the image capturing of the marker on the left side in the image is less than two (e.g., one) and the number of times of the image capturing of the marker on the right side in the image is two or more (e.g., four). FIG. 3B illustrates an image actually displayed in the display section 170 for presentation to the user. In FIG. 3B, squares in shapes corresponding to the positions and the postures of the square markers are drawn at positions where the markers are detected on the image. The squares are drawn in different colors depending on the case where the number of times of the image capturing is two or more and the case where the number of times of the image capturing is less than two (in FIG. 3B, the squares are drawn in gray when the number of times of the image capturing is less than two and in black when the number of times of image capturing is two or more). By drawing the squares in different colors, the user can confirm, on the image captured at the current time, whether the number of times of the image capturing of each marker up to that time is sufficient. In other words, the user can confirm the marker to be next captured by recognizing the marker for which the number of times of the image capturing does not reach a sufficient value.

When the user determines that the image of each marker has been captured in the sufficient number of times, such as when the images of all the markers have been captured two or more times, the user inputs the instruction for calculating the marker arrangement information, i.e., the position and the posture of each marker in the reference coordinate system, through the console 150. Responsively, the marker position and posture calculating section 180 calculates the position and the posture of the marker based on the marker detection result for each of a plurality of images.

Figure 4:
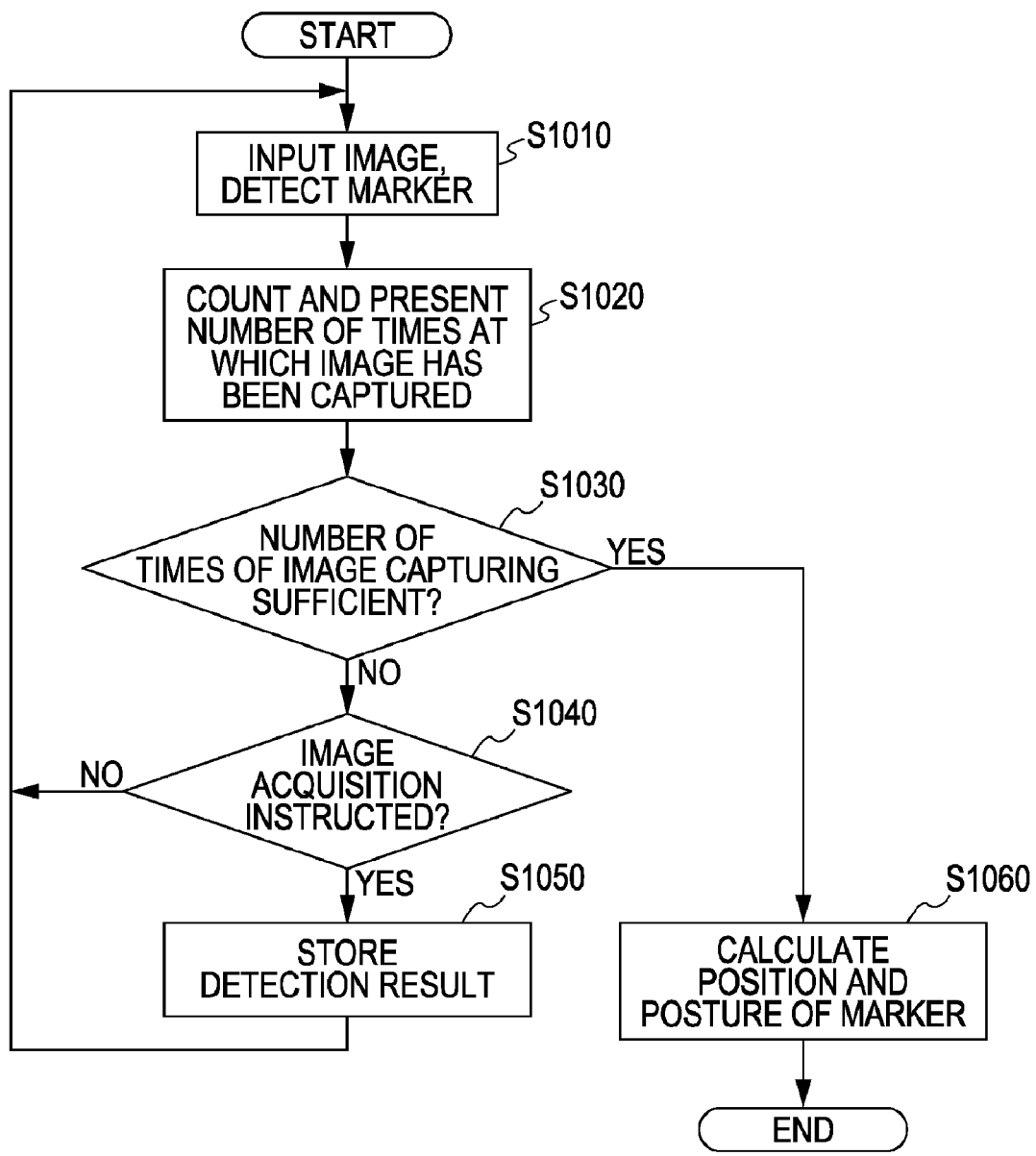
FIG. 4 is a flowchart of processing steps of a marker arrangement information measuring method according to the first exemplary embodiment.

FIG. 4 is a flowchart of processing steps of a marker arrangement information measuring method according to the first exemplary embodiment. First, in step S1010, the image input section 120 outputs the image captured by the image pickup section 110 to the marker detecting and identifying section 130. The marker detecting and identifying section 130 detects the markers contained in the image and reads the identifier specific to each marker for identification of the marker. Further, the marker detecting and identifying section 130 outputs, as detection data, the image coordinates of four apexes of the marker to the data managing section 140.

Next, in step S1020, the data managing section 140 refers to a counter counting the number of times of the image capturing of the marker up to that time, which is stored in the data storage section 160. Further, the data managing section 140 presents the number of times of the image capturing of each marker, which has been detected and identified in the image, to the user through the display section 170.

While referring to, on the screen, the marker on the image captured by the camera at the current time and the number of times of the image capturing of the relevant marker in the past, the user determines whether the images of all the markers as calibration targets have been captured in the sufficient number of times (e.g., two or more for each marker) up to that time. After determining whether the number of times of the image capturing is sufficient for each marker, the user inputs an instruction through the console 150. If it is determined in step S1030 that the image of each marker has been captured in the sufficient number of times up to that time, the processing flow advances to step S1060. The instruction can be input by the user pressing a particular key on a keyboard or operating a mouse on a GUI. If it is determined that the image of each marker has not been captured in the sufficient number of times up to that time, the processing flow advances to step S1040.

In step S1040, it is determined whether an image acquisition instruction is input by the user through the console 150. The image acquisition instruction can be input by the user pressing a particular key on the keyboard or operating the mouse on the GUI. If it is determined that the image acquisition instruction is input, the processing flow advances to step S1050, otherwise, the processing flow returns to step S1010.

In step S1050, for each marker detected and identified in step S1010, a set of the image number, the marker identifier, and the image coordinates of four apexes of the square defining the inner region of the marker are stored in the data storage section 160. Then, the value of a counter indicating the number of times at which each marker has been detected and identified is incremented by one. Thereafter, the processing flow returns to step S1010.

In step S1060, the position and the posture of the marker is calculated. A method of calculating the position and the posture of the marker is described next. It is herein assumed that the number of the markers as the calibration targets, i.e., the targets for each of which the position and the posture are to be calculated, is N and the number of the captured images is M. Also, it is assumed that a six-dimensional vector representing the position and the posture of a marker i (i=1, 2, ..., N) is $a_i$ and a six-dimensional vector representing the position and the posture of the camera having captured an image j (j=1, 2, ..., M) is $S_j$. The six-dimensional vector a representing the position and the posture of the marker is a vector made up of components representing the position of the marker in the reference coordinate system, which is given by;

$$t_{wm} = [t_{wm}{}^x t_{wm}{}^y t_{wm}{}^z]^t$$

and the posture of the marker with respect to the reference coordinate system, which is given by:

$$\omega_{wm} = [\omega_{wm}{}^x \psi_{wm}{}^y \omega_{wm}{}^z]^t$$

Namely, the six-dimensional vector a can be expressed by:

$$a = [t_{wm}{}^x t_{wm}{}^y t_{wm}{}^z \omega_{wm}{}^x \omega_{wm}{}^y \omega_{wm}{}^z]^t$$

Assuming that the position of the camera in the reference coordinate system is given by;

$$t_{wc} = [t_{wc}{}^x t_{wc}{}^y t_{wc}{}^z]^t$$

and the posture of the camera with respect to the reference coordinate system is given by;

$$\omega_{wc} = [\omega_{wc}{}^x \psi_{wc}{}^y \omega_{wc}{}^z]^t$$

the six-dimensional vector s representing the position and the posture of the camera can be similarly expressed by:

$$s = [t_{wc}{}^x t_{wc}{}^y t_{wc}{}^z \omega_{wc}{}^x \omega_{wc}{}^y \omega_{wc}{}^z]^t$$

The coordinates of each apex of the square marker in the marker coordinate system, i.e., $x_m{}^k = [x_m{}^k y_m{}^k z_m{}^k]^t$ (k=1, 2, 3 and 4), can be expressed, for example, by the following formula (1) on an assumption that the length of one side of the square is e, and therefore the coordinates of each apex are known values when the length of one side of the square is known:

$$x_m^1 = \left[-\frac{e}{2} - \frac{e}{2} 0\right]^t, \quad (1)$$
$$x_m^2 = \left[\frac{e}{2} - \frac{e}{2} 0\right]^t,$$
$$x_m^3 = \left[\frac{e}{2} \frac{e}{2} 0\right]^t,$$
$$x_m^4 = \left[-\frac{e}{2} \frac{e}{2} 0\right]^t$$

For the apex which has the marker coordinates $x_m$ and belongs to the marker having the position $t_{wm}$ and the posture $\omega_{wm}$ with respect to the reference coordinate system, camera coordinate $x_c$ thereof in terms of the camera having the position $t_{wc}$ and the posture $\omega_{wc}$ with respect to the reference coordinate system can be expressed by the following formula (2);

$$x_c = R(\omega_{wc})^{-1} \cdot (R(\omega_{wm}) \cdot x_m + t_{wm} - t_{wc}) \quad (2)$$

where $R(\omega_{wc})$ and $R(\omega_{wm})$ are (3×3) rotational transform matrices indicating the postures which are represented by $\omega_{wc}$ and $\omega_{wm}$, respectively. Also, when a point having camera coordinates, given by;

$$x_c = [x_c y_c z_c]^t$$

is projected onto an image by a pinhole camera with the focal length f, a projected position, given by;

$$u = [u_x u_y]^t$$

can be expressed by the following formula (3):

$$u_x = -f\frac{x_c}{z_c}, \quad u_y = -f\frac{y_c}{z_c} \quad (3)$$

In other words, u is a function of the position $t_{wm}$ and the posture $\omega_{wm}$ of the marker and the position $t_{wc}$ and the posture $\omega_{wc}$ of the camera. Accordingly, a two-dimensional vector $u_{i,j,k}$ representing the position of a projected image of an apex k (k=1, 2, 3 and 4) of the marker i on the image j is a function of $a_i$ and $s_j$ as expressed by the following formula (4):

$$u_{i,j,k} = F(a_i, s_j) \quad (4)$$

Assuming that $\hat{u}_{i,j,k}$ represents the position where the projected image of the apex k of the marker i is actually observed on the image j, an error $\Delta u_{i,j,k} (= \hat{u}_{i,j,k} - u_{i,j,k})$ between $\hat{u}_{i,j,k}$ and $u_{i,j,k}$, which is calculated from the observation position $\hat{u}_{i,j,k}$ and from $a_i$ and $s_j$, can be expressed by primary approximation as the following formula (5):

$$\Delta u_{i,j,k} \approx \left[\frac{\partial u_{i,j,k}}{\partial a_i} \frac{\partial u_{i,j,k}}{\partial s_j}\right]\left[\begin{array}{c}\Delta a_i \\ \Delta s_j\end{array}\right] \quad (5)$$

In the above formula, $\partial u_{i,j,k}/\partial a_i$ and $\partial u_{i,j,k}/\partial s_j$ represent a Jacobian determinant in which partial differentiation coefficients resulting from partially differentiating $u_{i,j,k}$ by respective components of $a_i$ and $s_j$ in the formula (4) are arrayed. Further, $\Delta a_i$ (i=1, 2, N) and $\Delta s_j$ (j=1, 2, ..., M) can be obtained by setting the formula (5) for each apex of each marker which has been detected and identified in each image, and by solving simultaneous equations with all $\Delta a_i$ (i=1, 2, ..., N) and $\Delta s_j$ (j=1, 2, ..., M) being common unknown variables. The position and the posture $a_i$ (i=1, 2, ..., N) of the marker can be determined by obtaining $\Delta a_i$ (i=1, 2, ..., N) and $\Delta s_j$ (j=1, 2, ..., M) in advance with initial values given to $a_i$ and $s_j$, and by repeating a process of corrections expressed by $a_i = a_i + \Delta a_i$ and $s_j = s_j + \Delta s_j$.

The initial values of the position and the posture of the camera can be obtained by mounting a position and posture sensor having 6 degrees of freedom, such as a magnetic, optical or ultrasonic sensor, to the camera and by taking in a measured value of the sensor. Those initial values can also be obtained by applying the known method, such as the DLT (Direct Linear Transform) method, to an image obtained by capturing the marker which has the position and posture known in the reference coordinate system.

The initial values of the position and the posture of the marker are obtained by manually measuring an approximate position in advance. Those initial values can also be obtained based on a projected image of the marker captured by a camera having the known position and posture.

According to the first exemplary embodiment, as described above, when the position and the posture of each marker arranged or set in a scene or an object are determined by using an image, information regarding the number of times of the image capturing of the marker up to that time is indicated on the captured image for notification to the user. Based on that information, the user can easily confirm for which marker the number of times of the image capturing is deficient and which marker image is to be next captured, and can efficiently perform the marker calibration.

Modification 1-1

While in the first exemplary embodiment the squares are drawn at the detected positions of the markers on the captured image in different colors depending on the number of times of the image capturing for each of the markers, the information regarding the number of times of the image capturing of the marker can also be notified to the user in any of other suitable manners. For example, only the outer frame portion of the square can be drawn in a different color instead of filling in the entire inner region of the maker with some color. Also, instead of changing the color, the marker for which the number of times of the image capturing is sufficient is drawn as a square at high transparency, while the marker for which the number of times of the image capturing is deficient is drawn as a square at low transparency. As an alternative, the transparency can be set to levels reversal to the above case. Further, the information regarding the number of times of the image capturing can be presented only for the marker for which the number of times of the image capturing is deficient, while no information is presented for the marker for which the number of times of the image capturing is sufficient. As an alternative, the information can be presented in a reversed manner.

Instead of the figure drawing, the information regarding the number of times of the image capturing can also be presented as character information. For example, the number of times of the image capturing up to that time can be indicated in numeral per marker nearby the detected area of the marker on the image. As an alternative, the number of times of the image capturing which is still required to be performed per marker can be indicated in numeral instead of the number of times of the image capturing up to that time.

Modification 1-2

While in the first exemplary embodiment the information presenting method is changed depending on whether the image of the marker has been captured two or more times, the criterion number is not limited to two. The user can freely set the number of times of the image capturing, which serves as a criterion for changing the information presenting method, by using the console 150. In that case, the information presenting method is changed depending on the number of times of the image capturing, which is set as the criterion by the user.

Modification 1-3

While in the first exemplary embodiment the information is presented at the detected position of the marker on the image, the information presenting method is not limited to such an example. As another example, when the approximate position and posture of the camera and the approximate position and posture of the marker are known in any manner, the information presenting method can be modified such that the projected position of the marker on the captured image is calculated based on those approximate positions and postures, and the information is presented at the calculated position. The approximate position and posture of the camera can be obtained by mounting a position and posture sensor having 6 degrees of freedom, such as a magnetic, optical or ultrasonic sensor, to the camera, or by executing calculations based on the projected image of the marker, for which the approximate or accurate position and posture are known, on the captured image. The approximate position and posture of the marker can be obtained by performing manual measurement in advance, or by executing calculations based on the captured image while setting, as a reference, the marker for which the approximate or accurate position and posture are known.

Modification 1-4

While in the first exemplary embodiment the square marker is used as a target marker for calibrating the arrangement information, the features of the present invention are not impaired even when point markers or markers having other suitable shapes are used.

Modification 1-5

While in the first exemplary embodiment the information presenting method is changed for each marker depending on the number of times of the image capturing, the information presenting method can be changed between the marker for which the accurate position and posture are known in advance, e.g., a reference marker defining the reference coordinate system, and a marker which is a target for calibrating the position and the posture thereof.

Modification 1-6

In the first exemplary embodiment, in step S1030 in the flowchart of FIG. 4, the user determines whether the number of times of the image capturing of the marker is sufficient, and then explicitly inputs the instruction for calculating the position and the posture of the marker through the console 150.

However, the determination in step S1030 can also be automatically executed by the computer. Further, if the images of all the markers are each captured in the predetermined number of times or more, the computer can automatically start the process for calculating the position and the posture of the marker with no need of explicit input of the instruction from the user.

Second Exemplary Embodiment

In the first exemplary embodiment, the user is notified of the information regarding the number of times at which each marker observed on the image has been captured by the camera in the past for the measurement of the marker position. In this second exemplary embodiment, the user is notified of information regarding in which direction(s) the image of each marker has been captured up to that time, thus indicating the direction(s) in which the number of times of the image capturing of the marker is deficient, so that the user can confirm in which direction the image of the marker is to be next captured, while observing the captured image.

FIG. 5 is a block diagram showing the functional configuration of a marker arrangement information measuring apparatus according to the second exemplary embodiment. The functional configuration of the marker arrangement information measuring apparatus according to the second exemplary embodiment is similar to that of the marker arrangement information measuring apparatus according to the first exemplary embodiment, and a detailed description of common components is not repeated here.

As in the first exemplary embodiment, an image pickup section 110 captures an image of a scene or an object on which markers are arranged. The captured image is input to a computer through an image input section 120. A marker detecting and identifying section 130 detects each marker region from the image input through the image input section 120 and reads an identifier specific to each marker for identification of the marker. Further, the marker detecting and identifying section 130 outputs the identifier of the marker and the image coordinates of each apex of the marker to a data managing section 240.

Figure 6A:
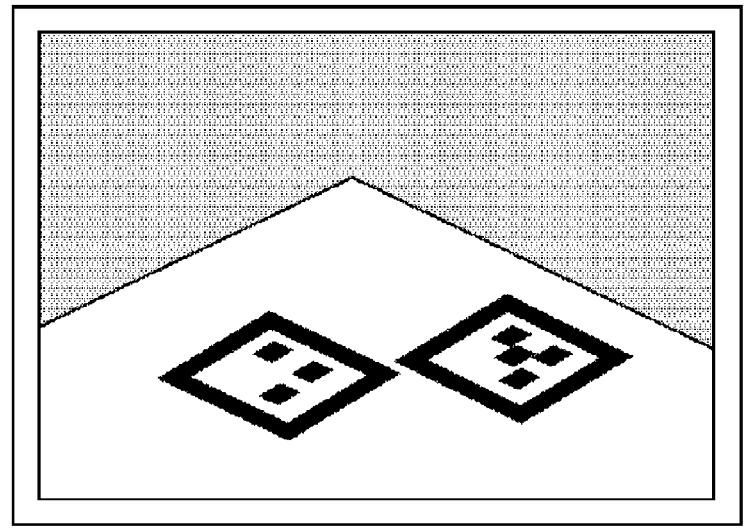
FIGS. 6A and 6B illustrate a method of presenting information that indicates in which direction(s) the image of each marker has been captured in the past.
Figure 6B:
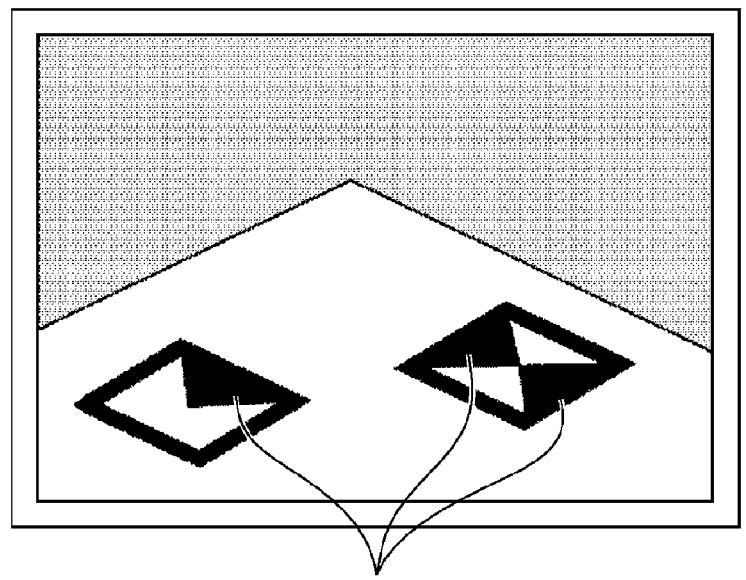

The data managing section 240 refers, for each marker detected and identified in the marker detecting and identifying section 130, to information stored in a data storage section 260 and indicating in which direction(s) the image of the relevant marker has been captured in the past. The marker detecting and identifying section 130 then presents the information to the user through a display section 270. Accordingly, for each marker appearing on the image captured at the current time, the user can receive the information regarding in which direction(s) the image of the marker has been captured in the past, and the user can confirm in which direction the image of the marker is to be next captured. FIGS. 6A and 6B illustrate a method of presenting, according to this second exemplary embodiment, the information regarding in which direction(s) the image of each marker has been captured in the past. In FIGS. 6A and 6B, the information regarding in which one of four directions corresponding to four sides of each square marker the image of the marker has been captured in the past is displayed over the marker detected on the object image in a superimposed relation. FIG. 6A shows an image which has been captured by the image pickup section 110 and input to the image input section 120. The captured image is displayed in the display section 270 as shown in FIG. 6B. A marker image shown on the left side of FIG. 6B represents a marker of which image has been captured in the past in the direction indicated by a triangle filled in with black, i.e., of which image has been captured in only one direction in the past. A marker image shown on the right side of FIG. 6B represents a marker which includes two triangles filled in with black and of which image has been captured in two directions in the past.

When an image acquisition instruction is input through a console 150, the data managing section 240 stores, in the data storage section 260, the marker detection and identification result obtained from the image which is output from the marker detecting and identifying section 130 and is displayed at the current time, i.e., the identifier of the marker, the image coordinates of each apex of the marker, and the image capturing direction(s) which has been detected and identified in the image.

When an instruction for calculating the position and the posture of the marker is input through the console 150, the data managing section 240 reads the marker detection result from the data storage section 260 and outputs the marker detection result to a marker position and posture calculating section 180. Based on the marker detection result, the marker position and posture calculating section 180 calculates the position and the posture of the marker and outputs the calculated results.

Figure 7:
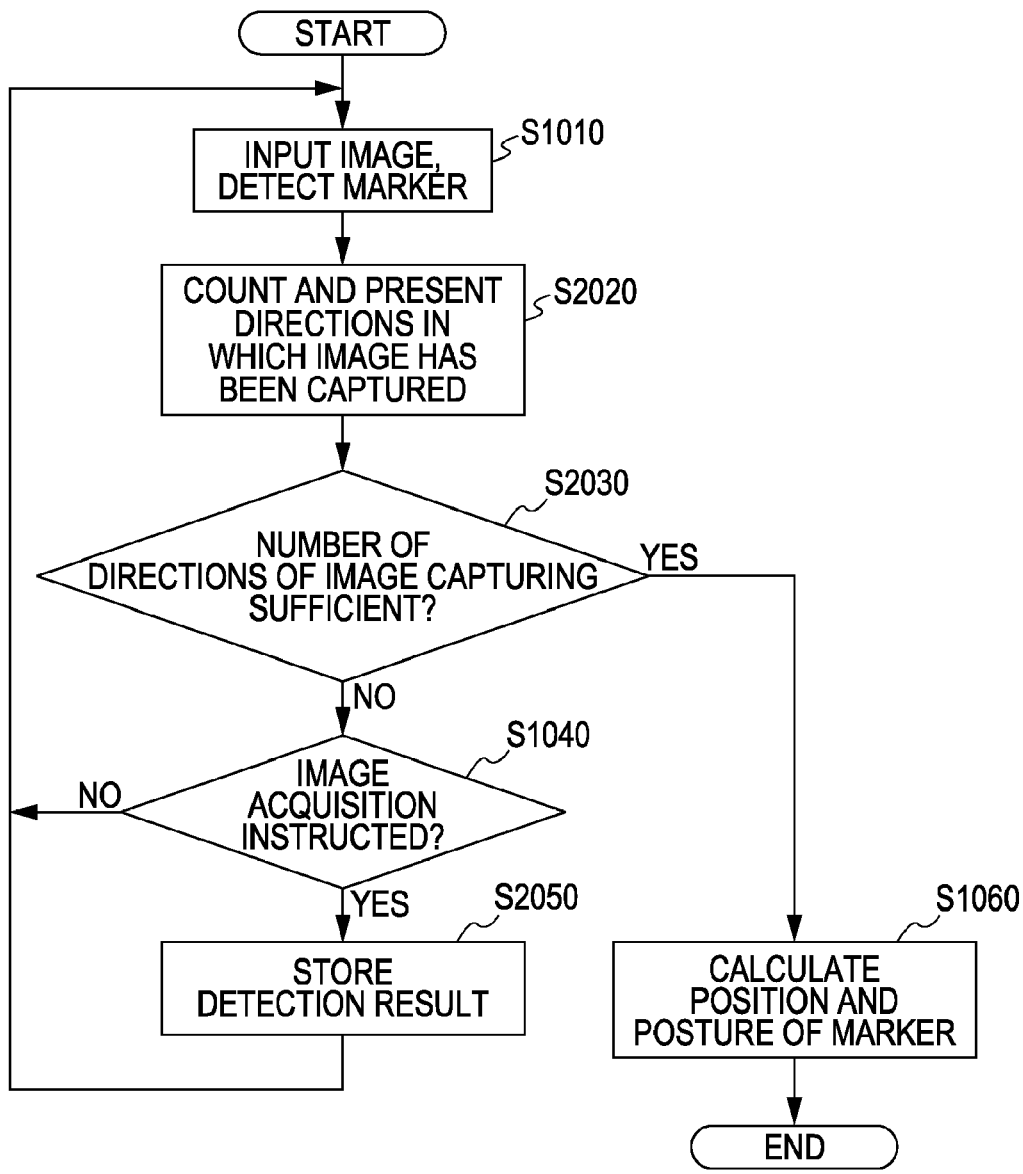
FIG. 7 is a flowchart of processing steps of a marker arrangement information measuring method according to the second exemplary embodiment.

FIG. 7 is a flowchart of processing steps of a marker arrangement information measuring method according to the second exemplary embodiment. First, in step S1010, the image input section 120 outputs the image captured by the image pickup section 110 to the marker detecting and identifying section 130. The marker detecting and identifying section 130 detects the markers contained in the image and reads the identifier specific to each marker for identification of the marker. Further, the marker detecting and identifying section 130 outputs, as detection data, the image coordinates of four apexes of the marker to the data managing section 240.

Next, in step S2020, the data managing section 240 refers to the information regarding in which direction(s) the image of each marker has been captured in the past, the information being stored in the data storage section 260. Further, the data managing section 240 presents the direction(s) in which the image of each marker has been captured in the past, to the user through the display section 270.

While referring to, on the screen, the marker on the image captured by the camera at the current time and the image capturing direction(s) of the relevant marker in the past, the user determines whether the images of all the markers as calibration targets have been captured in sufficient image capturing directions up to that time. For example, a rotation range of the marker about an axis defined by a normal line with respect to the marker is divided into four angular spans (i.e., 90 degrees), and the user determines whether the image of the marker has been captured in all four directions corresponding to the divided four angular spans. Thus, the user determines whether the image of each marker has been captured in sufficient image capturing directions. Based on the determination result, the user inputs an instruction through the console 150. If it is determined in step S2030 that the image of each marker has been captured in sufficient image capturing directions up to that time, the processing flow advances to step S1060. The instruction can be input by the user pressing a particular key on a keyboard or operating a mouse on a GUI. If it is determined that the image of each marker has not been captured in sufficient image capturing directions up to that time, the processing flow advances to step S1040.

In step S1040, it is determined whether an image acquisition instruction is input by the user through the console 150. The image acquisition instruction can be input by the user pressing a particular key on the keyboard or operating the mouse on the GUI. If it is determined that the image acquisition instruction is input, the processing flow advances to step S2050, otherwise, the processing flow returns to step S1010.

In step S2050, the image coordinates of four apexes of each marker detected and identified in step S1010 are stored in the data storage section 260. After setting a flag indicating the direction in which the image of the marker has been captured, the processing flow returns to step S1010. Herein, the image capturing direction of the marker is decided as follows. In this second exemplary embodiment, a rotation range of the square marker as the calibration target about a normal line with respect to the marker, i.e., about a $z_m$ axis of the marker coordinate system in FIG. 2B, is divided into four angular spans corresponding to four sides of the square, and flags representing four directions corresponding to the divided four angular spans are prepared. The determination as to in which direction the image of the marker is captured is made based on the length of each side of the square in the captured image. Thus, the image capturing direction is determined as the direction corresponding to the longest side of the square in the captured image, and the flag corresponding to the longest side is set.

In step S1060, the position and the posture of the marker is calculated in a similar manner to that in the first exemplary embodiment.

According to the second exemplary embodiment, as described above, information regarding in which direction(s) the image of each marker has been captured up to that time is presented to the user who observes the captured image, thus indicating in which direction(s) the number of times of the image capturing of each marker is deficient. Based on that information, the user can confirm in which direction the image of the relevant marker is to be next captured.

Modification 2-1

While in the second exemplary embodiment the image capturing direction in the past is presented to the user by filling in a portion of the marker with black, which corresponds to the image capturing direction in the past, the directing indicating method is not limited to such an example. As another example, the image capturing direction can be presented by changing a color of the relevant side of the square defining the marker on the captured image. As an alternative, the image capturing direction can be displayed by changing transparency of the corresponding portion of the marker. In other words, the image capturing direction can be presented in an arbitrary suitable manner so long as the user can easily discern the image capturing direction.

Modification 2-2

While in the second exemplary embodiment the image capturing direction of the marker is determined based on the length of each side of the square in the captured image, the direction determining method is not limited to such an example. One alternative method is as follows. The relative position and posture of the camera with respect to the square marker are determined based on the image coordinates of each apex of the square marker by using the two-dimensional projective transformation or any of other suitable methods. Then, based on the determined posture, the rotation of the marker about its normal axis is extracted by the known method. Further, while in the second exemplary embodiment the rotation range of the marker about its normal axis is divided into four angular spans, the number of divisions is not limited to four. Also, the dividing direction is not limited to the rotating direction of the marker about its normal axis, and the marker observing direction can be divided in an arbitrary suitable manner.

Modification 2-3

While in the second exemplary embodiment the information regarding in which direction(s) the image of each marker has been captured in the past is presented to the user, the information presenting method is not limited to such an example. As another example, the information regarding the number of times of the image capturing, described above in the first exemplary embodiment, can also be additionally presented to the user in a combined manner. Further, those two kinds of information can be presented in the form indicating the number of times of the image capturing for each image capturing direction.

Modification 2-4

While in the second exemplary embodiment the information regarding in which direction(s) the image of each marker has been captured in the past is presented to the user, the presented information is not limited to the direction. Other information such as the distance between the camera and the marker and the position of the camera relative to the marker at the time of image capturing can also be presented to the user. Because the size of the marker is known, the information regarding the distance between the camera and the marker can be presented by comparing the size of the marker in the captured image with the known size of the marker to roughly determine the distance therebetween, and indicating the roughly determined distance. The information regarding the position of the camera relative to the marker can also be presented in a similar manner.

Third Exemplary Embodiment

FIG. 8 is a block diagram showing the functional configuration of a marker arrangement information measuring apparatus according to a third exemplary embodiment. An image pickup section 800 is constituted by a video camera and captures an image of a scene or an object on which markers are arranged. An image input section 810 takes the image captured by the image pickup section 800 into a computer. A marker detecting section 820 detects each marker from the image taken into the computer by the image input section 810. Further, a marker identifying section 830 identifies the marker detected by the marker detecting section 820. A data managing section 840 stores, in a data storage section 850, a marker identification result input from the marker identifying section 830. An analyzing section 860 analyzes the marker identification result stored in the data storage section 850. A display section 870 displays an image obtained by combining an image corresponding to an analysis result of the analyzing section 860 with the image taken in by the image input section 810. In addition, when an instruction for calculating marker arrangement information is input through a console 880, the data managing section 840 outputs, to a marker arrangement information calculating section 890, the marker identification result stored in the data storage section 850. The marker arrangement information calculating section 890 calculates the marker arrangement information based on the marker identification result.

The marker used as a measurement target in this third exemplary embodiment is, e.g., a square marker or a point marker.

An outline of the operation of the marker arrangement information measuring apparatus according to the third exemplary embodiment will be described below. The video camera constituting the image pickup section 800 outputs a motion image to the image input section 810 regardless of the operation of a user. The display section 870 displays the motion image input to the image input section 810 on a screen at any time the user desires. Therefore, the user can confirm, on the screen, the image captured by the video camera. The user captures the image of the scene or the object on which the markers are arranged while freely moving the video camera.

The marker detecting section 820 detects each marker contained in the image which has been input to the image input section 810. In order to detect the above-described square marker from the input image, the marker detecting section 820 executes a binarization process and a labeling process on connected areas in the input image, thus extracting the inner region surrounded by the black frame that represents the boundary region of the square marker. Further, the marker detecting section 820 executes line fitting on the inner region of the square marker and determines the image coordinates of four apexes of the square defining the inner region. Thereafter, the marker detecting section 820 outputs a combination of the image and the image coordinates to the marker identifying section 830.

Based on the image coordinates of the detected marker input from the marker detecting section 820, the marker identifying section 830 executes two-dimensional projective transformation to transform the square marker on the captured image into an orthogonally projected image. Further, the marker identifying section 830 reads the orientation decision region and the bit region, thus reading and identifying the identifier of the square marker.

The data managing section 840 receives the marker identification result from the marker identifying section 830. When an instruction for acquiring the image captured by the video camera at the current time is input as a command entered through the console 880 in accordance with a user's input operation, the data managing section 840 stores, in the data storage section 850, the marker identification result input from the marker identifying section 830. Accordingly, the data storage section 850 stores the marker identification results for a plurality of images. The marker identification results are each stored in a set of the image number, the marker identifier, and the image coordinates of four apexes of the square defining the inner region of the marker.

When the instruction for acquiring the image captured by the video camera at the current time is input through the console 880 and the marker identification result input from the marker identifying section 830 is stored in the data storage section 850, the analyzing section 860 analyzes the identification results of all the markers, which are stored in the data storage section 850. Further, the analyzing section 860 determines whether the arrangement information of the marker as the measurement target in the reference coordinate system can be measured. That determination is made, for example, based on whether the image of the marker for which the arrangement information in the reference coordinate system is known is captured in a predetermined number of times. The marker for which the arrangement information in the reference coordinate system is known can be the square marker shown in FIG. 2A, or a marker of which arrangement information is represented by the position of a point (hereinafter referred to as a "point marker") as shown in FIG. 9. The point marker shown in FIG. 9 is a circular marker in which the inside is filled in with a single color. In this third exemplary embodiment, the center of gravity of the circle is assumed to be the position of the point marker.

As in the known photogrammetric technique, the marker arrangement information calculated from only the marker identification result provides only the relative positional relationship between the markers. The relative positional relationship can be represented by the position and the posture of each marker on the basis of an arbitrary reference coordinate system (hereinafter referred to as a "relative reference coordinate system"), e.g., a marker coordinate system of one square marker. In order that the arrangement information of the marker as the measurement target in the reference coordinate system can be measured, the correspondence between the relative reference coordinate system and the reference coordinate system is required to be known. Assuming that the relative reference coordinate system and the reference coordinate system have the same scale, the correspondence between those two coordinate systems can be represented by the position and the posture of one coordinate system with respect to the other coordinate system.

To obtain the correspondence between the relative reference coordinate system and the reference coordinate system, for one or more square markers each having the position and the posture known in the reference coordinate system, it is required to measure the position and the posture of the relevant square marker in the relative reference coordinate system. To measure the position and the posture of the square marker having the known size in the relative reference coordinate system, the image of the relevant square marker is required to be captured at least one or more times by the camera of which position and posture in the relative reference coordinate system are known. Also, the correspondence between the relative reference coordinate system and the reference coordinate system can be obtained when the positions of three or more point markers in the relative reference coordinate system are measured, those point markers having the positions known in the reference coordinate system and not lying on the same straight line. To measure the position of each point marker in the relative reference coordinate system, the relevant point marker is required to be captured at least two or more times by the camera of which position and posture in the relative reference coordinate system are known.

The analyzing section 860 analyzes the identification results stored in the data storage section 850. For example, the analyzing section 860 analyzes as to whether the square marker having the position and the posture known in the reference coordinate system has been captured one or more times, or whether three or more point markers having the positions known in the reference coordinate system have been each captured two or more times. Then, the analyzing section 860 determines whether the arrangement information of the marker as the measurement target in the reference coordinate system can be measured, and outputs a determination result as the analysis result.

The user inputs, through the console 880, not only the instruction for acquiring the image captured by the video camera at the current time, but also the instruction for calculating the marker arrangement information, i.e., the position and the posture of each marker, to the marker arrangement information calculating section 890. When the analyzing section 860 outputs the analysis result that the arrangement information of the marker in the reference coordinate system can be measured, the marker arrangement information calculating section 890 calculates the position and the posture of each marker in the reference coordinate system. When the analyzing section 860 outputs the analysis result that the arrangement information of the marker in the reference coordinate system cannot be measured, the marker arrangement information calculating section 890 selects one of the markers as the measurement targets and calculates the position and the posture of each marker in the relative reference coordinate system which is defined by the marker coordinate system of the selected marker. For example, when the user determines that a sufficient number of images have been captured, while capturing the image by the video camera, the user inputs the instruction for calculating the marker arrangement information to the marker arrangement information calculating section 890 which executes the calculation of the marker arrangement information. Also, when the user inputs the instruction for capturing the image through the console 880, the marker arrangement information calculating section 890 can automatically calculate, after storing the identification result of the marker in the captured image, the marker arrangement information based on the marker identification result stored in the data storage section 850. The marker arrangement information calculated in the marker arrangement information calculating section 890 is stored in the data storage section 850 through the data managing section 840. The stored marker arrangement information is the arrangement information in the reference coordinate system or the relative reference coordinate system. While repeating the acquisition of the image and the calculation of the marker arrangement information, the user finally measures the marker arrangement information in the reference coordinate system with sufficient accuracy. Further, it is assumed that even when the arrangement information of the marker in the reference coordinate system is known, the marker arrangement information is stored in the data storage section 850.

The position and posture calculating section 900 calculates the position and the posture of the video camera at the current time based on the marker arrangement information stored in the data storage section 850. More specifically, the position and posture calculating section 900 receives, from the marker identifying section 830, the identification result of the marker in the image which has been input from the image pickup section 800 to the image input section 810. Based on the correspondence between the image coordinates of each apex of the square marker or each point marker and three-dimensional coordinates, the position and posture calculating section 900 calculates the position and the posture of the video camera at the time of capturing of the relevant image.

Figure 10A:
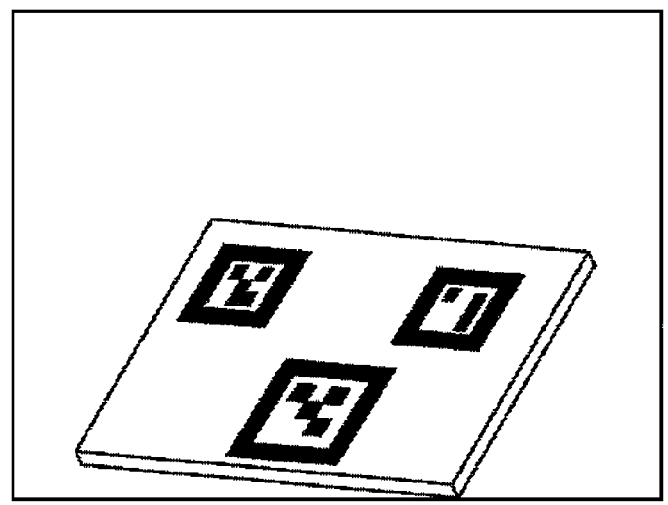
FIGS. 10A, 10B and 10C illustrate an information presenting method according to the third exemplary embodiment.
Figure 10B:
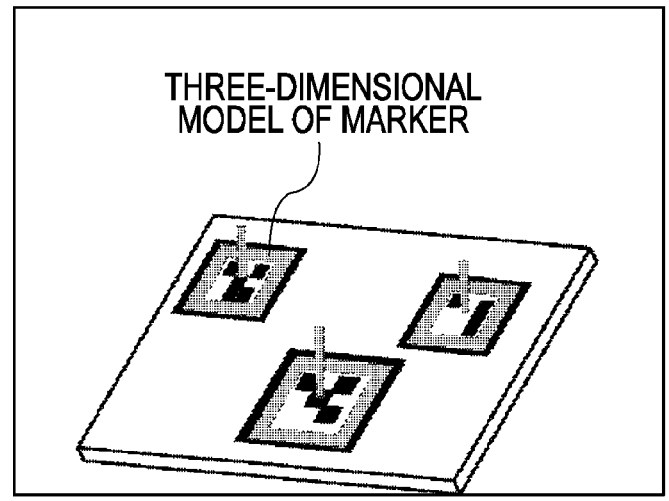
Figure 10C:
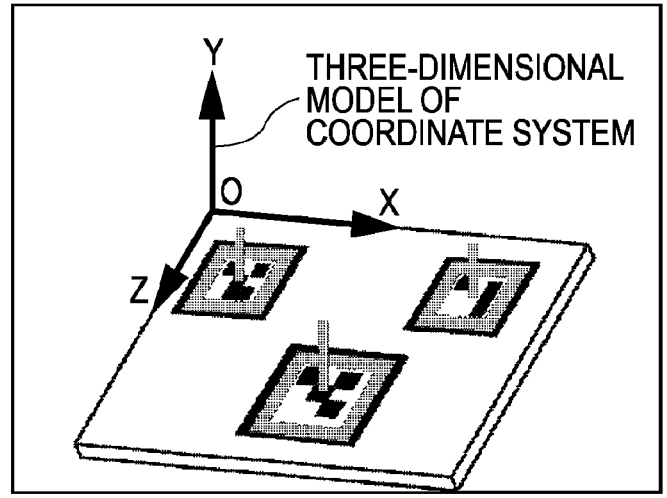

The display section 870 displays the image input to the image input section 810 on the screen at any time the user desires. On that occasion, based on the analysis result output from the analyzing section 860, information is presented to the user in different manners between the case where the arrangement information of the marker in the reference coordinate system can be measured and the other case. FIGS. 10A, 10B and 10C illustrate an information presenting method depending on whether the arrangement information of the marker in the reference coordinate system can be measured. When the analyzing section 860 determines that the arrangement information of the marker in the reference coordinate system cannot be measured and also determines that the arrangement information of the marker in the relative reference coordinate system can be measured, the display section 870 executes processing as follows. Based on the position and the posture of the video camera in the relative reference coordinate system which are output from the position and posture calculating section 900, a three-dimensional model of each marker in the relative reference coordinate system is drawn on the captured image shown in FIG. 10A and is displayed on a display (not shown) in a combined manner with the image input to the image input section 810 as shown in FIG. 10B. The display can be a display ordinarily used in association with a computer, such as a CRT or an LCD, or a head mounted display which is an image display device used in the AR technology. When the analyzing section 860 determines that the arrangement information of the marker in the reference coordinate system can be measured, the display section executes processing as follows. As shown in FIG. 10C, based on the position and the posture of the image pickup apparatus (video camera) in the reference coordinate system which are output from the position and posture calculating section 900, an image drawing both a three-dimensional model representing the reference coordinate system and a three-dimensional model of each marker in the reference coordinate system is combined with the captured image in a superimposed relation. Because the above-described information presenting method enables the user to confirm on the displayed image whether the arrangement information of the marker in the reference coordinate system can be measured, the user can confirm whether the image of the marker for which the arrangement information in the reference coordinate system is known is to be further captured.

As shown in FIG. 10B, the three-dimensional model of the marker in the reference coordinate system or the relative reference coordinate system is made up of, e.g., the outer frame surrounding the inner region of the marker and a segment representing the normal direction with respect to the marker (i.e., a segment extending in the $z_m$ direction from the center of the marker in FIG. 2B). However, the three-dimensional model of the marker in the reference coordinate system or the relative reference coordinate system can be any of other suitable models so long as it represents the shape of the marker. For example, the three-dimensional model of the marker can be only the outer frame surrounding the inner region of the marker. The three-dimensional model representing the reference coordinate system is made up of, e.g., segments extending from the origin of the reference coordinate system as a start point in the directions of three axes orthogonal to one another. Those segments correspond respectively to an x-axis, a y-axis and a z-axis of the reference coordinate system (or an $x_w$-axis, a $y_w$-axis and a $z_w$-axis in FIG. 2B). The three-dimensional model representing the reference coordinate system can include character information indicating the names of the three axes and the origin as shown in FIG. 10C.

Figure 11:
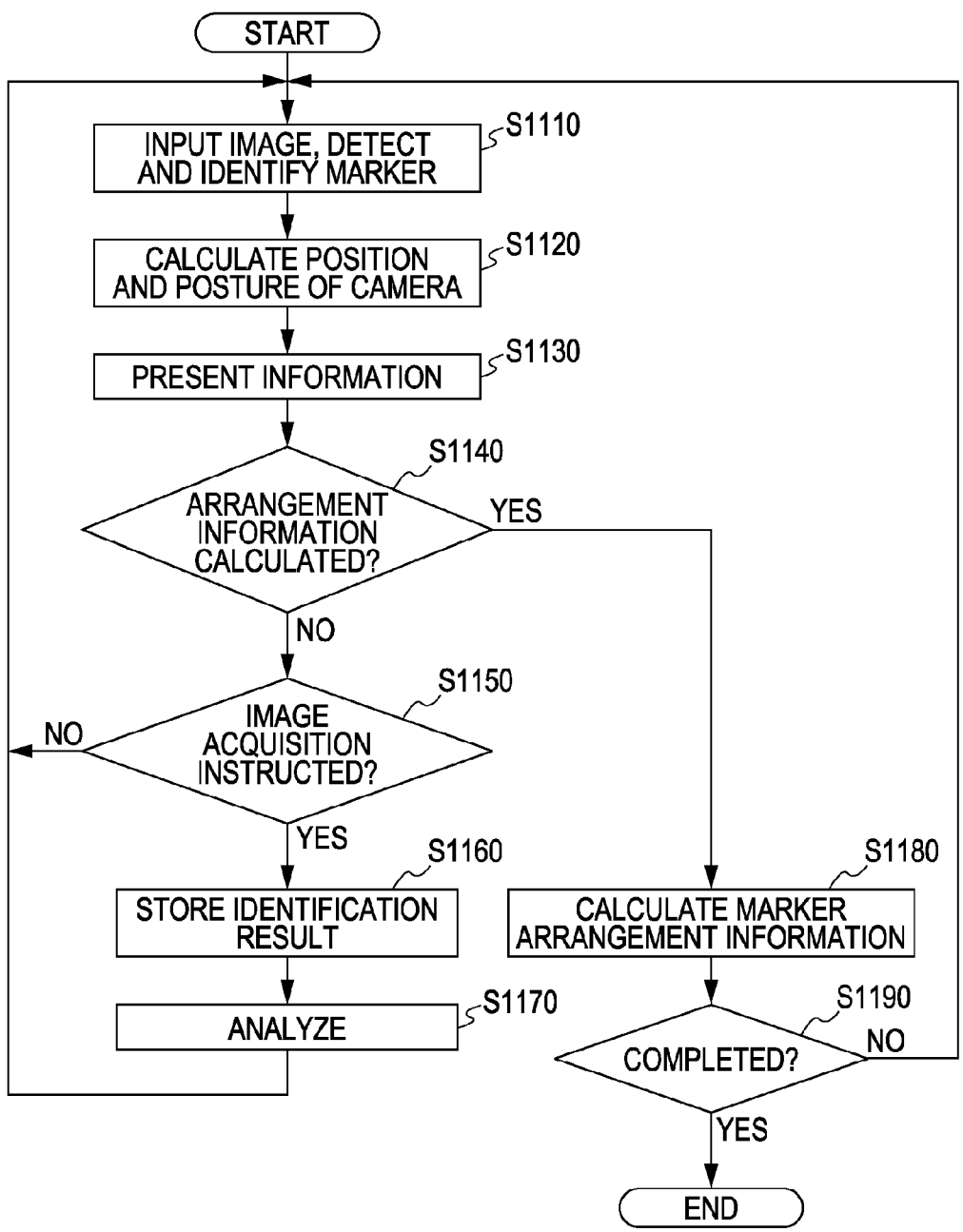
FIG. 11 is a flowchart of processing steps of a marker arrangement information measuring method according to the third exemplary embodiment.

FIG. 11 is a flowchart of processing steps of a marker arrangement information measuring method according to the third exemplary embodiment. First, in step S1110, the image input section 810 outputs the image captured by the image pickup section 800 to the marker detecting section 820. The marker detecting section 820 executes a binarization process and a labeling process on connected areas in the input image, thus extracting the inner region of the square marker. Further, the marker detecting section 820 executes line fitting on the outer periphery of the inner region and determines the image coordinates of four apexes of the inner region of the square marker, to detect the square marker. When the marker as the measurement target includes the point marker which is represented by, e.g., a circular area filled in with a single color, the marker detection is performed as follows. A marker region is determined through the steps of extracting pixels having the same color as the point marker by checking whether pixels provide a particular area in a YUV color space image corresponding to the filled-in color, and by executing the labeling process on the interconnected pixels in the same color. Then, the point marker is detected by calculating the center of gravity of the marker region in the captured image.

Based on the image coordinates of the detected marker input from the marker detecting section 820, the marker identifying section 830 executes identification of the marker. More specifically, for the square marker, the marker identifying section 830 transforms the square marker on the captured image into an orthogonally projected image based on the image coordinates of the detected marker. Further, the marker identifying section 830 reads the orientation decision region and the bit region, thus reading and identifying the identifier of the square marker. Further, the point marker can be identified, for example, by clicking the mouse at the position of the detected marker on the captured image, or by first manually identifying the point marker and then dynamically tracking the identified point marker among the images. When the point marker is a natural feature point having a specific identifier, such as described in Daniel F. Abawi, Joachim Bienwald, Ralf Dorner: "Accuracy in Optical Tracking with Fiducial Markers: An Accuracy Function for AR Tool Kit", Proc. ISMAR 2004, PP. 260-261, 2004, the point marker can be identified by using an identifier which is directly obtained from the captured image when the marker is detected from the image. The identification result is sent to the data managing section 840 and the position and posture calculating section 900.

Next, in step S1120, the position and posture calculating section 900 calculates the position and the posture of the video camera at the current time. If the analysis result output from the analyzing section 860 indicates the determination that the arrangement information of the marker in the reference coordinate system can be measured, the position and posture calculating section 900 calculates the position and the posture of the video camera (image pickup apparatus) in the reference coordinate system. On the other hand, if the arrangement information of the marker in the relative reference coordinate system can be measured, the position and posture calculating section 900 calculates the position and the posture of the video camera (image pickup apparatus) in the relative reference coordinate system. When the markers observed on the captured image are not on the same plane in a three-dimensional space, the position and the posture of the video camera (image pickup apparatus) can be calculated by solving linear simultaneous equations based on the correspondence between the image coordinates and the three-dimensional coordinates by using the Direct Linear Transform (DLT) method, for example. Also, when the markers observed on the captured image lie on the same plane in the three-dimensional space, the position and the posture of the video camera can be calculated by solving linear simultaneous equations based on the correspondence between the image coordinates and two-dimensional plane coordinates and by executing the two-dimensional projective transformation between the relevant plane and the image plane. Further, as described in D. G. Lowe, "Fitting Parameterized Three-Dimensional Models to Images", IEEE Transactions on Pattern Analysis and Machine Intelligence, vol. 13, no. 5, pp. 441-450, 1991 (hereinafter "Lowe"), the position and the posture of the video camera can be optimized through the steps of obtaining initial values of the position and the posture of the video camera by a certain method, and executing repetitive calculations so that an error between the image coordinates of the marker detected on the captured image and the calculated image coordinates is minimized. Those initial values can be obtained by solving the above-described linear simultaneous equations, or by utilizing the position and the posture obtained in a preceding frame. The repetitive calculations can be executed, for example, by the Gauss-Newton method or the Levenberg-Marquardt method. In addition, the position and the posture of the video camera can also be calculated through the step of removing outliers, which are caused by false detection of the marker and false adaptation, by using a robust estimation method such as M-estimation or RANSAC (RANdom SAmple Consensus).

In step S1130, the information regarding whether the arrangement information of the marker in the reference coordinate system can be measured is presented to the user. When the analysis result output from the analyzing section 860 indicates that the arrangement information of the marker in the reference coordinate system can be measured, the following processing is executed. Based on the position and the posture of the video camera in the reference coordinate system which are calculated in step S1120, the image drawing both the three-dimensional model representing the reference coordinate system and the three-dimensional model of the marker in the reference coordinate system is combined with the captured image and displayed in a superimposed relation. When the analysis result output from the analyzing section 860 indicates that the arrangement information of the marker in the reference coordinate system cannot be measured, the following processing is executed. Based on the position and the posture of the video camera in the relative reference coordinate system which are calculated in step S1120, the image drawing the three-dimensional model of the marker in the relative reference coordinate system is combined with the captured image and displayed in a superimposed relation.

In step S1140, it is determined whether the instruction for calculating the marker arrangement information is input through the console 880. If the determination result indicates the input of the instruction, the processing flow advances to step S1180, otherwise, the processing flow advances to step S1150. The instruction can be input by the user pressing a particular key on the keyboard or operating the mouse on the GUI.

In step S1150, it is determined whether the instruction for acquiring the image is input through the console 880. If the determination result indicates the input of the instruction, the processing flow advances to step S1160, otherwise, the processing flow returns to step S1110. The instruction can be input by the user pressing a particular key on the keyboard or operating the mouse on the GUI.

In step S1160, for each marker detected and identified in step S1110, a set of the image number, the marker identifier, and the image coordinates of four apexes of the square defining the inner region of the marker (in the case of a point marker, the image coordinates of the point marker) is stored in the data storage section 850. Thereafter, the processing flow advances to step S1170.

In step S1170, the analyzing section 860 analyzes the identification results of all the markers stored in the data storage section 850 and determines whether the arrangement information of the marker as the measurement target in the reference coordinate system can be measured. For example, the determination is made as to whether the image of the marker having the arrangement information known in the reference coordinate system has been captured in the predetermined number of times. When the marker for which the arrangement information in the reference coordinate system is known is a square marker, the determination is made as to whether one or more square markers have been captured in the image one or more times. On that occasion, the image of the relevant square marker is to be captured together with one or more other markers which are also the measurement targets. While the predetermined number of times of the image capturing is set to one or more herein, it is not limited to such a value. The predetermined number of times of the image capturing can be set to two or more for the measurement with higher accuracy. When the marker for which the arrangement information in the reference coordinate system is known is a point marker, the determination is made as to whether three or more point markers not lying on the same straight line have each been captured in the image two or more times. In the case of the point marker, the image of the point marker is to be captured together with one or more other markers which are also the measurement targets. Further, as in the case of the square marker, the number of times of the image capturing of the point marker is not limited to two or more, and it can be set to three or more for the measurement with higher accuracy. The markers for which the arrangement information in the reference coordinate system is known can be a mixed combination of the square marker and the point marker. In such a case, if any of the above-described conditions is satisfied, it is determined that the arrangement information of the marker in the reference coordinate system can be measured. When the processing of step S1170 is completed, the processing flow returns to step S1110. The processing flow can be modified such that, regardless of whether the instruction for calculating the marker arrangement information is input by the user, the flow automatically advances to step S1180 after step S1170 to calculate the marker arrangement information.

In step S1180, the marker arrangement information is calculated. The method of calculating the marker arrangement information is described next. The following description is first made of the method of calculating the marker arrangement information in the relative reference coordinate system, and then made of the method of transforming the relative reference coordinate system to the reference coordinate system. It is herein assumed that the number of the markers as the calibration targets, i.e., the targets for each of which the arrangement information is to be calculated, is N and the number of the captured images is M. Also, it is assumed that a six-dimensional vector representing the position and the posture of a square marker i (i=1, 2, . . . , N) is $a_i$ and a six-dimensional vector representing the position and the posture of the camera having captured an image j (j=1, 2, . . . , M) is $s_j$. The six-dimensional vector a representing the position and the posture of the marker is a vector made up of components representing the position of the marker in the relative reference coordinate system, which is given by:

$$t_{wm} = [t_{wm}^x \, t_{wm}^y \, t_{wm}^z]^t$$

and the posture of the marker with respect to the relative reference coordinate system, which is given by:

$$\omega_{wm} = [\omega_{wm}^x \, \psi_{wm}^y \, \omega_{wm}^z]^t$$

Namely, the six-dimensional vector a can be expressed by:

$$a = [t_{wm}^x \, t_{wm}^y \, t_{wm}^z \, \omega_{wm}^x \, \omega_{wm}^y \, \omega_{wm}^z]^t$$

Assuming that the position of the camera in the relative reference coordinate system is given by:

$$t_{wc} = [t_{wc}^x \, t_{wc}^y \, t_{wc}^z]^t$$

and the posture of the camera with respect to the relative reference coordinate system is given by:

$$\omega_{wc} = [\omega_{wc}^x \, \psi_{wc}^y \, \omega_{wc}^z]^t$$

the six-dimensional vector s representing the position and the posture of the camera can be similarly expressed by:

$$s = [t_{wc}{}^x t_{wc}{}^y t_{wc}{}^z \omega_{wc}{}^x \omega_{wc}{}^y \omega_{wc}{}^z]^t$$

The coordinates of each apex of the square marker in the marker coordinate system, i.e., $x_m{}^k = [x_m{}^k\ y_m{}^k\ z_m{}^k]^t$ (k=1, 2, 3 and 4), can be expressed, for example, by the following formula (6) on an assumption that the length of one side of the square is 2e (e>0), and therefore the coordinates are known values when the length of one side of the square is known:

$$x_m{}^1 = [-e\ -e\ 0]^t,\ x_m{}^2 = [e\ -e\ 0]^t,\ x_m{}^3 = [e e\ 0]^t,\ x_m{}^4 = [-e e\ 0]^t \quad (6)$$

For the apex which has the marker coordinates $x_m$ and belongs to the marker having the position $t_{wm}$ and the posture $\omega_{wm}$ with respect to the relative reference coordinate system, camera coordinate $x_c$ thereof in terms of the camera having the position $t_{wc}$ and the posture $\omega_{wc}$ with respect to the relative reference coordinate system can be expressed by the following formula (7):

$$x_c = R(\omega_{wc})^{-1} \cdot (R(\omega_{wm}) \cdot x_m + t_{wm} - t_{wc}) \quad (7)$$

where $R(\omega_{wc})$ and $R(\omega_{wm})$ are (3×3) rotational transform matrices indicating the postures which are represented by $\omega_{wc}$ and $\omega_{wm}$, respectively. Also, when a point having camera coordinates, given by:

$$x_c = [x_c\ y_c\ z_c]^t$$

is projected onto an image by a pinhole camera with the focal length f, a projected position, given by:

$$u = [u_x u_y]^t$$

can be expressed by the following formula (8):

$$u_x = -f \frac{x_c}{z_c},\ u_y = -f \frac{y_c}{z_c} \quad (8)$$

In other words, u is a function of the position $t_{wm}$ and the posture $\omega_{wm}$ of the marker and the position $t_{wc}$ and the posture $\omega_{wc}$ of the camera. Accordingly, a two-dimensional vector $u_{i,j,k}$ representing the position of a projected image of an apex k (k=1, 2, 3 and 4) of the marker i on the image j is a function of $a_i$ and $s_j$ as expressed by the following formula (9):

$$u_{i,j,k} = F(a_i, s_j)$$

Assuming that $\hat{u}_{i,j,k}$ represents the position where the projected image of the apex k of the marker i is actually observed on the image j, an error $\Delta u_{i,j,k} (= u_{i,j,k} - \hat{u}_{i,j,k})$ between the observation position $\hat{u}_{i,j,k}$ and $u_{i,j,k}$, which is calculated from $a_i$ and $s_j$, can be expressed by primary approximation as the following formula (10):

$$\Delta u_{i,j,k} \approx \begin{bmatrix} \frac{\partial u_{i,j,k}}{\partial a_i} & \frac{\partial u_{i,j,k}}{\partial s_j} \end{bmatrix} \begin{bmatrix} \Delta a_i \\ \Delta s_j \end{bmatrix} \quad (10)$$

In the above formula, $\partial u_{i,j,k}/\partial a_i$ and $\partial u_{i,j,k}/\partial s_j$ represent a Jacobian determinant in which partial differentiation coefficients resulting from partially differentiating $u_{i,j,k}$ by respective components of $a_i$ and $s_j$ in the formula (9) are arrayed. Further, $\Delta a_i$ (i=1, 2, ..., N) and $\Delta s_j$ (j=1, 2, ..., M) can be obtained by setting the formula (10) for each apex of each marker which has been detected and identified in each image, and by solving simultaneous equations with all $\Delta a_i$ (i=1, 2, ..., N) and $\Delta s_j$ (j=1, 2, ..., M) being common unknown variables. The position and the posture $a_i$ (i=1, 2, ..., N) of the marker can be determined by obtaining $\Delta a_i$ (i=1, 2, ..., N) and $\Delta s_j$ (j=1, 2, ..., M) in advance with initial values given to $a_i$ and $s_j$, and by repeating a process of corrections expressed by $a_i = a_i + \Delta a_i$ and $s_j = s_j + \Delta s_j$.

The initial values of the position and the posture of the camera are given by the position and the posture calculated in the position and posture calculating section 900. As an alternative, those initial values can be obtained by mounting a position and posture sensor having 6 degrees of freedom, such as a magnetic, optical or ultrasonic sensor, to the camera and by taking in a measured value of the sensor. Further, those initial values can also be obtained by using the known method, such as the DLT (Direct Linear Transform) method, based on the image coordinates of the marker which has the position and posture known in the relative reference coordinate system. The initial values of the position and the posture of the marker are obtained by manually measuring an approximate position in advance. Those initial values can also be obtained based on a projected image of the marker captured by a camera having the known position and posture in the relative reference coordinate system. In the case of a square marker having a known size, the position and the posture of the square marker can be calculated by executing two-dimensional projective transformation between an actual plane and an image plane based on the correspondence between the actual-plane position in the marker coordinate system and the image coordinates for each apex of the square marker. In the case of a point marker, the position of the point marker can be calculated based on the principle of triangular surveying if the image of the point marker has been captured by two or more cameras each having the position and the posture known in the relative reference coordinate system.

The method of transforming the arrangement information of the marker in the relative reference coordinate system to the arrangement information of the marker in the reference coordinate system is described next. First, description is made of the case where the square marker having the position and the posture known in the reference coordinate system has been captured and the position and the posture of the relevant square marker in the relative reference coordinate system have been calculated by the above-described method of calculating the marker arrangement information. Herein, the position and the posture of the square marker in the reference coordinate system, which square marker has the position and the posture known in the reference coordinate system, are represented by a three-dimensional vector $t_{wm}$ and a (3×3) rotational matrix $R_{wm}$. Also, the position and the posture of the square marker in the relative reference coordinate system are represented by a three-dimensional vector $t_{sm}$ and a (3×3) rotational matrix $R_{sm}$. A three-dimensional vector t' and a (3×3) rotational matrix R' representing the position and the posture of the marker in the reference coordinate system, respectively, can be expressed by the following formula (11) in which t is a three-dimensional vector representing the position of the relevant marker in the relative reference coordinate system and R is a (3×3) rotational matrix representing the posture of the relevant marker therein, those position and posture being calculated by the above-described method of calculating the marker arrangement information:

$$t' = R_{wm} \cdot R_{wm}{}^{-1} \cdot (t - t_{wm}) + t_{wm}$$

$$R' = R_{wm} \cdot R_{wm}{}^{-1} \cdot R \quad (11)$$

The following description is made of the case where the positions of three or more point markers having the positions known in the reference coordinate system and not lying on the same straight line have been each captured in the image two or more times. In that case, because the position of each of those point markers in the relative reference coordinate system is calculated, the relative position and posture between both the coordinate systems are calculated based on the correspondence between the positions of each point marker in the two coordinate systems. For example, when the number of the point markers is three and the point markers lie on the same plane, a coordinate transform matrix is obtained by executing the two-dimensional projective transformation between two planes. When the point markers are not on the same plane, a coordinate transform matrix M satisfying a formula (12), given below, is obtained by the method of least squares, for example:

$$\begin{bmatrix} x_w^1 & x_w^2 & x_w^3 & x_w^4 & \ldots \\ y_w^1 & y_w^2 & y_w^3 & y_w^4 & \ldots \\ z_w^1 & z_w^2 & z_w^3 & z_w^4 & \ldots \\ 1 & 1 & 1 & 1 & \ldots \end{bmatrix} = M \begin{bmatrix} x_s^1 & x_s^2 & x_s^3 & x_s^4 & \ldots \\ y_s^1 & y_s^2 & y_s^3 & y_s^4 & \ldots \\ z_s^1 & z_s^2 & z_s^3 & z_s^4 & \ldots \\ 1 & 1 & 1 & 1 & \ldots \end{bmatrix} \quad (12)$$

In the formula (12), $x_w{}^n = [x_w{}^n \ y_w{}^n \ z_w{}^n \ 1]^t$ (n=1, 2, . . . ) represents the position of the point marker in the reference coordinate system, and $x_s{}^n = [x_s{}^n \ y_s{}^n \ z_s{}^n \ 1]^t$ (n=1, 2, . . . ) represents the position of the point marker in the relative reference coordinate system.

It is here assumed that a (3×3) rotational matrix $R_{ws}$ represents a rotation of the coordinate transform matrix M, and a three-dimensional vector $t_{ws}$ represents a parallel movement of the coordinate transform matrix M. A three-dimensional vector t' and a (3×3) rotational matrix R' representing the position and the posture of the marker in the reference coordinate system, respectively, can be expressed by the following formula (13) in which t is a three-dimensional vector representing the position of the relevant marker in the relative reference coordinate system and R is a (3×3) rotational matrix representing the posture of the relevant marker therein, those position and posture being calculated by the above-described method of calculating the marker arrangement information:

$$t' = R_{wm} \cdot t + t_{wm}$$

$$R' = R_{wm} \cdot R \quad (13)$$

After calculating the marker arrangement information in step S1180, the processing flow advances to step S1190. If the arrangement information of the marker in the reference coordinate system cannot be calculated in step S1180, the processing flow returns to step S1110 to continue the image capturing of the marker for which the arrangement information in the reference coordinate system is known. Also, even when the arrangement information of the marker in the reference coordinate system can be calculated in step S1180, it is possible to return the processing flow to step S1110 to continue the image capturing if the user cannot satisfy with the measurement accuracy.

According to the third exemplary embodiment, as described above, since the information regarding whether the arrangement information of the marker in the reference coordinate system can be measured is presented to the user, the user can momentarily confirm whether the image capturing is to be further continued, and the measurement of the marker arrangement information can be efficiently performed.

Modification 3-1

In the third exemplary embodiment, the information regarding whether the arrangement information of the marker in the reference coordinate system can be measured is presented to the user by drawing the three-dimensional model representing the reference coordinate system. However, the information presenting method is not limited to such an example. Any of other suitable methods can also be used so long as it is able to display, on the captured image, the information regarding whether the arrangement information of the marker in the reference coordinate system can be measured.

For example, the information can be presented by changing the color of the three-dimensional model, which represents the marker, depending on whether the arrangement information of the marker in the reference coordinate system can be measured. Also, instead of changing the color of the three-dimensional model, the three-dimensional model representing the marker can be drawn at low transparency when the arrangement information of the marker in the reference coordinate system can be measured, and drawn at high transparency when that arrangement information cannot be measured. As an alternative, the transparency can be set to levels reversal to the above case.

Figure 13A:
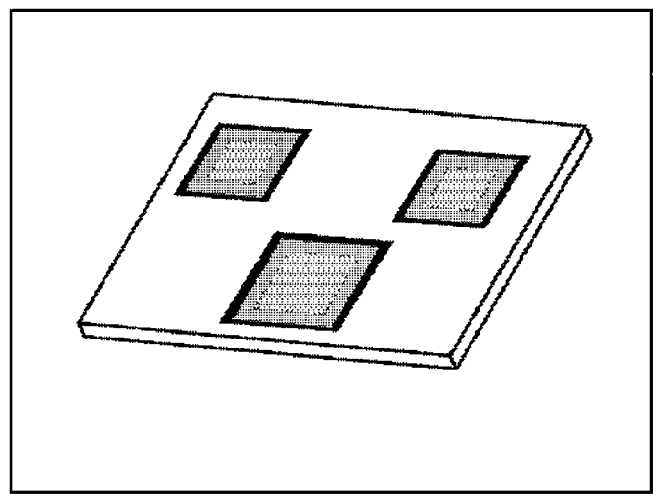
FIGS. 13A, 13B and 13C illustrate an information presenting method according to Modification 3-1.
Figure 13B:
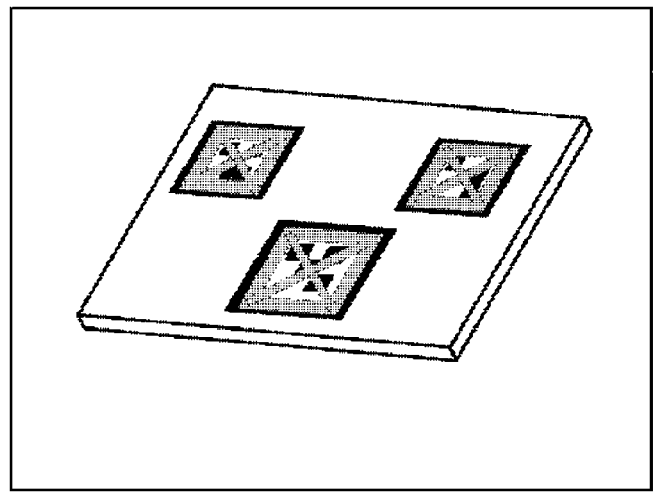
Figure 13C:
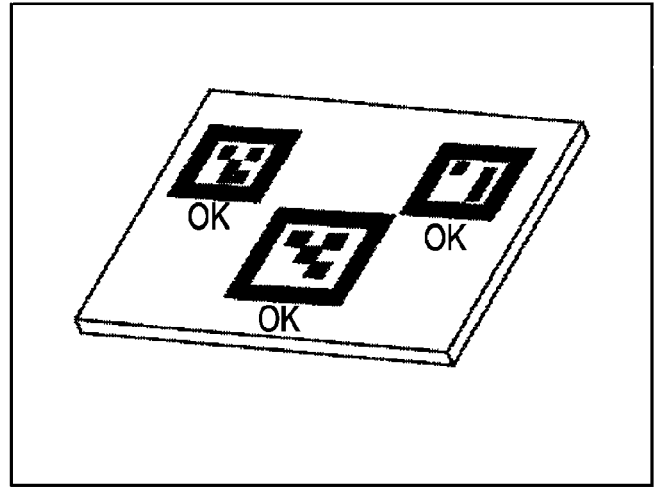

While in the third exemplary embodiment the information regarding whether the arrangement information of the marker in the reference coordinate system can be measured is three-dimensionally presented to the user by employing the position and the posture of the video camera and the three-dimensional models of both the reference coordinate system and the marker, that information can also be presented in a two-dimensional manner. For example, it is possible to utilize only the identification information, which is stored in the data storage section 850, without calculating the position and the posture of the video camera. More specifically, when the arrangement information of the marker in the reference coordinate system can be measured, the relevant information can be presented to the user by filling in the inside of each detected square marker with some color, taking into account the image coordinates of each apex of the detected square marker as shown in FIG. 13A, or by drawing diagonal lines in each detected square marker as shown in FIG. 13B. Instead of presenting the information in figures, the information can also be presented in the form of text as shown in FIG. 13C. Further, instead of presenting the information to the user, the marker arrangement information can be automatically calculated when the arrangement information of the marker in the reference coordinate system can be measured.

Modification 3-2

Figure 12A:
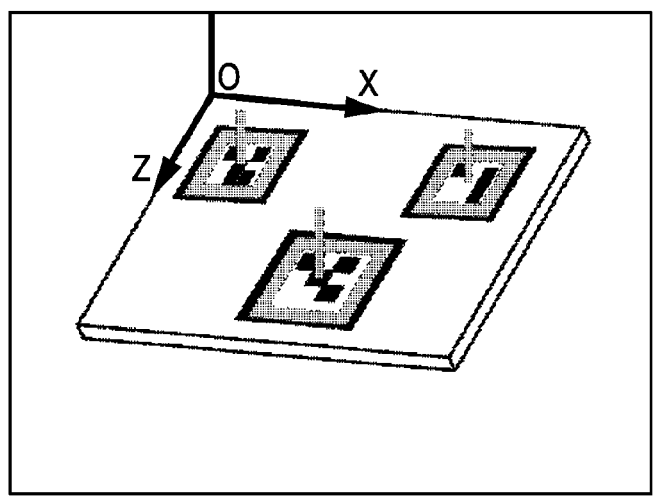
FIGS. 12A, 12B and 12C illustrate an information presenting method according to Modification 3-2.
Figure 12B:
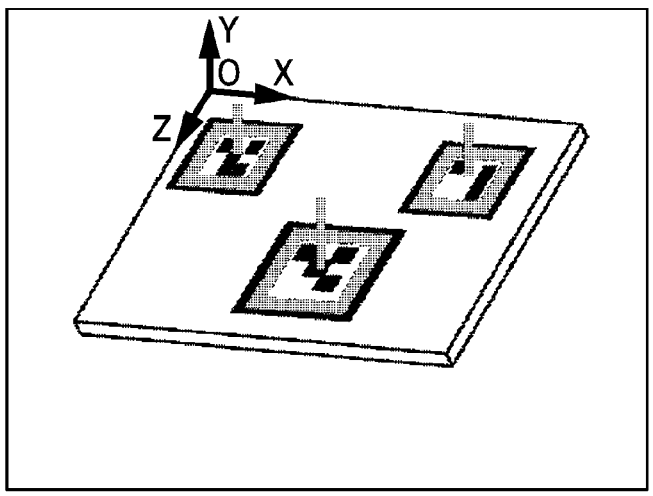
Figure 12C:
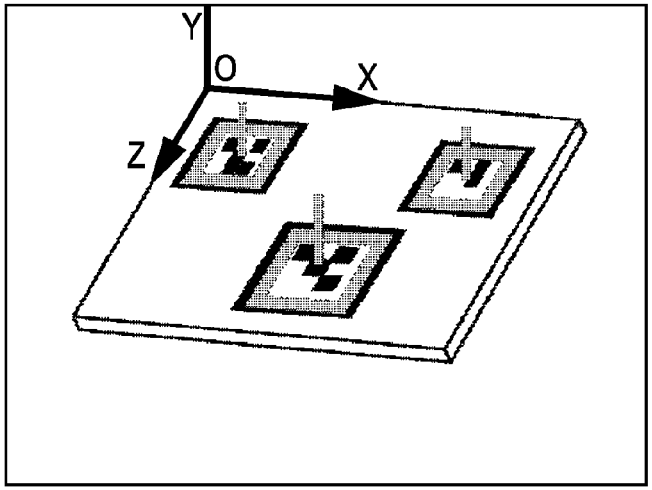

In the third exemplary embodiment, the information regarding whether the arrangement information of the marker in the reference coordinate system can be measured is presented to the user by drawing the three-dimensional model representing the reference coordinate system. According to that method, however, when the size of the three-dimensional model representing the reference coordinate system is kept fixed, there is a possibility that the three-dimensional model extends out of the screen as shown in FIG. 12A. To avoid such a drawback, as shown in FIG. 12B, the size of the three-dimensional model representing the reference coordinate system can be adjusted by using the position, the posture and the focal length of the video camera so that the three-dimensional model is always held within the screen. Further, instead of changing the size of the three-dimensional model representing the reference coordinate system, the position where the three-dimensional model is displayed can be adjusted, as shown in FIG. 12C, so that text information indicating each coordinate axis is always held within the screen.

Fourth Exemplary Embodiment

In the second exemplary embodiment, the image capturing direction of each marker is displayed after conversion to a corresponding direction on a plane in which the inner region of the marker is divided into four parts. However, the direction presenting method in the present invention is not limited to the method displaying the image capturing direction of each marker after conversion to a corresponding direction on the plane.

Figure 15A:
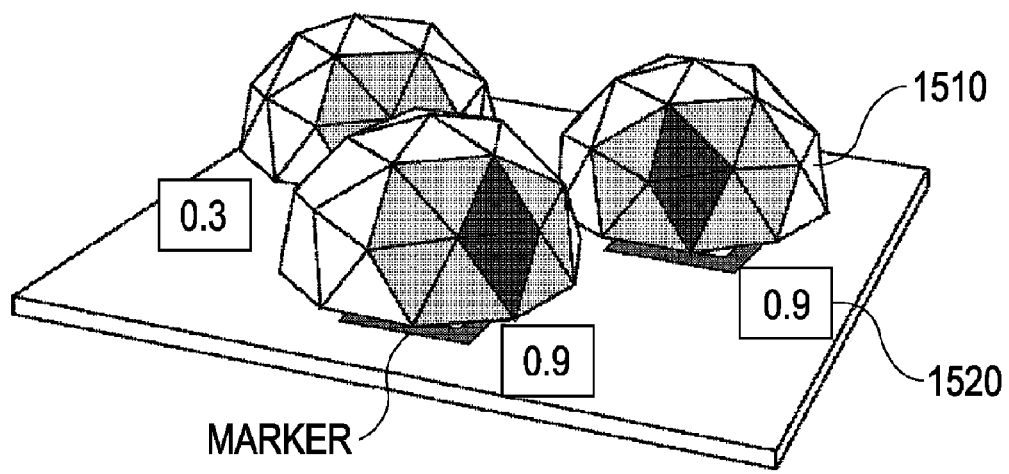
FIGS. 15A and 15B illustrate an information presenting method according to the fourth exemplary embodiment.
Figure 15B:
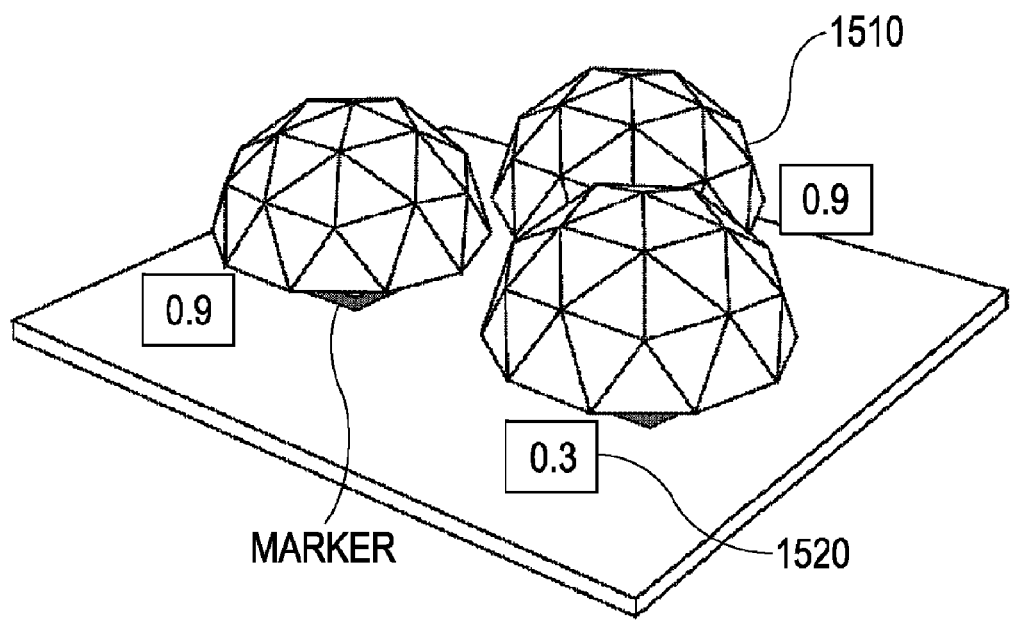

In a fourth exemplary embodiment, the image capturing direction of each marker, the distance up to the marker captured in the image, and the number of times of the image capturing of the marker (those items of information regarding the image capturing of each marker will be hereinafter referred to as "image capturing information") are displayed in the form of a three-dimensional object corresponding to each marker. Displaying the three-dimensional object enables the user to confirm which marker is to be captured next in which image capturing direction and at what a distance. In this fourth exemplary embodiment, a hemispherical object 1510 is displayed as the three-dimensional object, as shown in FIGS. 15A and 15B. Also, in this fourth exemplary embodiment, the color of a part of the surface of the hemispherical object 1510 is changed depending on both the image capturing direction of the corresponding marker and the number of times of the image capturing.

By displaying the image capturing information of the marker with the object 1510 indicating the three-dimensional image capturing direction of the marker, only the information regarding the direction in which the image is viewed at the current time can be displayed in an emphasized way. More specifically, an area corresponding to the image capturing information regarding the direction in which the image is viewed at the current time is drawn in larger size than that in the other direction due to the effect of drawing processing (perspective projection and hidden surface elimination) to project the three-dimensional object 1510 onto the projection surface. In other words, attribute information, e.g., color, set for the three-dimensional object 1510 is drawn in a larger area than the case when the attribute information is two-dimensionally displayed on a plane. With that effect, the user can determine whether the image is to be captured in the relevant direction, based on a relatively simple determination criterion, i.e., a colored area on the screen. Assume, for example, the case where the user observes a scene from an image capturing position set as shown in FIG. 15A. Viewing from such an image capturing point, the user is given with an image shown in FIG. 15A. In the presented image, a color indicating that a marker has already been captured in the image from that position is displayed on the three-dimensional object 1510. Therefore, the user can determine that the image is not required to be captured any more from that position. Further, assume that the user moves to another image capturing position and an image shown in FIG. 15B is captured. In the image of FIG. 15B, a color indicating that the marker is not yet captured in the image from the other position is displayed on appearing faces of the three-dimensional object 1510 in the presented image. From the presented image, therefore, the user can determine that the image is required to be captured from the other position.

Also, by displaying, near the marker, a numeral value indicating marker detection accuracy 1520 at the time of image capturing of the marker, the user can confirm the detection accuracy (detection reliability) of each marker, of which image has been captured so far, in terms of numerical value, thus enabling the image capturing position to be fed back with high accuracy.

FIG. 14 is a block diagram showing the functional configuration of a marker arrangement information measuring apparatus according to the fourth exemplary embodiment. The functional configuration of the marker arrangement information measuring apparatus according to the fourth exemplary embodiment is similar to that of the marker arrangement information measuring apparatus according to the third exemplary embodiment. A detailed description of common components is not repeated here.

As in the third exemplary embodiment, an image pickup section 800 captures an image of a scene or an object on which markers are arranged. The captured image is input to a computer through an image input section 810. A marker detecting section 820 detects each marker from the image taken into the computer through the image input section 810. Further, a marker identifying section 830 identifies the detected marker and stores a marker identification result in a data managing section 1440.

The data managing section 1440 receives the marker identification result input from the marker identifying section 830. When an instruction for acquiring the image captured by the image pickup section 800 (video camera) is input as a command entered through a console 880, the data managing section 1440 stores, in a data storage section 1450, the marker identification result input from the marker identifying section 830.

The data storage section 1450 stores the marker identification results for a plurality of images. The marker identification results are each stored as a set of plural items given below:
  image number
  identifier of each marker
  image coordinates of four apexes of square defining the inner region of the marker
  relative position and posture of the video camera (only when they can be calculated)

When the instruction for acquiring the image captured by the video camera at the current time is input through the console 880 in accordance with the user's input operation and the marker identification result input from the marker identifying section 830 is stored in the data storage section 1450, the analyzing section 1460 analyzes the identification results of all the markers, which are stored in the data storage section 1450. In this fourth exemplary embodiment, the analyzing section 1460 executes not only the determination described in the third exemplary embodiment, i.e., the determination as to whether the arrangement information of the measurement target can be calculated in the reference coordinate system, but also calculations to detect the following items of information. Stated another way, based on the marker identification results, the analyzing section 1460 stores:
  marker identifier
  three-dimensional direction at the time of image capturing (hereinafter referred to as "three-dimensional image capturing direction")
  distance up to the marker in the relative reference coordinate system at the time of image capturing (hereinafter referred to as "image capturing distance")
  number of times of the image capturing for each of faces of the three-dimensional object, which is made correspondent to the three-dimensional image capturing direction of the marker
  marker detection accuracy
in a mutually correspondent manner for each of the markers captured in the image. The method of obtaining the analysis result will be described later.

The analysis result obtained for each marker is output to a display section 1470.

The display section 1470 displays the image input through the image input section 810 on a screen at any time the user desires. On that occasion, based on the analysis result output from the analyzing section 1460, the display section 1470 presents, near each marker, the three-dimensional object 1510 indicating the image capturing information of the marker and the marker detection accuracy 1520. FIG. 15A illustrates one example for presenting, to the user, the three-dimensional object 1510 for each of the identified markers. In this fourth exemplary embodiment, the three-dimensional object 1510 representing the image capturing information of the marker is displayed in the form of a geodesic dome which is obtained by projecting a regular icosahedron onto a spherical surface and dividing a curved surface into regular triangles. Further, in this fourth exemplary embodiment, the three-dimensional object 1510 is arranged such that a linear line parallel to a normal vector passing a central point of the marker passes the zenith of the geodesic dome. Because of no need of displaying an image in the horizontal direction in which the marker is not detected, the three-dimensional object 1510 is displayed such that, as shown in FIG. 15A, the three-dimensional object 1510 is moved in the normal direction and its bottom surface is spaced from the marker by a preset certain distance.

Processing steps of a marker arrangement information measuring method according to the fourth exemplary embodiment are similar to those, shown in FIG. 11, according to the third exemplary embodiment. The following description is made of only steps S1130, S1160 and S1170 which differ in processing from those in the third exemplary embodiment.

In step S1130, the display section 1470 first decides a color by referring, among the analysis results obtained by the analyzing section 1460 in step S1170, to the number of times of the image capturing for each of the faces of the three-dimensional object 1510 which indicate the three-dimensional image capturing direction of the marker. The method of calculating the number of times of the image capturing for each of the faces of the three-dimensional object 1510 will be described later. In this fourth exemplary embodiment, the color of each face of the three-dimensional object 1510 is set to be white when the number of times of the image capturing of the relevant face is 0, gray when the number of times of the image capturing is one, and black when the number of times of the image capturing is two or more. By changing the color of each face of the three-dimensional object 1510 in such a way, when the image of the face is captured in directions overlapping with each other, the user can be prompted to distribute the three-dimensional image capturing directions as far as possible. Note that, in the present invention, the display colors and the manner of assigning the colors depending on the number of times of the image capturing are not limited to those ones described above in this fourth exemplary embodiment. As seen from the above description of the fourth exemplary embodiment, the present invention can also be practiced by using any of other suitable manners so long as it is able to display the image capturing information of a range appearing on the image at the current time in an emphasized manner, thus enabling the user to confirm the image capturing direction of the marker and the number of times of the image capturing thereof.

In addition, the display section 1470 displays, near each marker, a numeral value of the marker detection accuracy 1520 calculated by the analyzing section 1460, as shown in FIG. 15A. The display position of the numerical value can be set, for example, to a certain three-dimensional position on the same plane as that on which the marker is arranged, taking into account the predetermined direction and distance with respect to the central point of the marker.

Finally, based on the position and the posture of the video camera which are obtained by the position and posture calculating section 900, the display section 1470 produces an image drawing the three-dimensional object 1510 and the marker detection accuracy 1520 therein, and displays the produced image in a superimposed relation to the captured image.

In step S1160, for each marker detected and identified in step S1110, a set of the image number, the marker identifier, the image coordinates of four apexes of the square defining the inner region of the marker (in the case of a point marker, the image coordinates of the point marker), and the relative position and posture of the video camera is stored in the data storage section 1450. Thereafter, the processing flow advances to step S1170. The relative position and posture of the video camera are stored only when they can be calculated in step S1120.

In step S1170, the analyzing section 1460 analyzes the identification results of all the markers stored in the data storage section 1450. More specifically, the analyzing section 1460 executes not only the determination described above in the third exemplary embodiment, i.e., the determination as to whether the arrangement information of the marker in the reference coordinate system can be measured, but also the calculations to obtain the number of times of the image capturing corresponding to the three-dimensional image capturing direction of the marker, the three-dimensional image capturing direction, the image capturing distance, and the marker detection accuracy 1520 for each marker.

Figure 16:
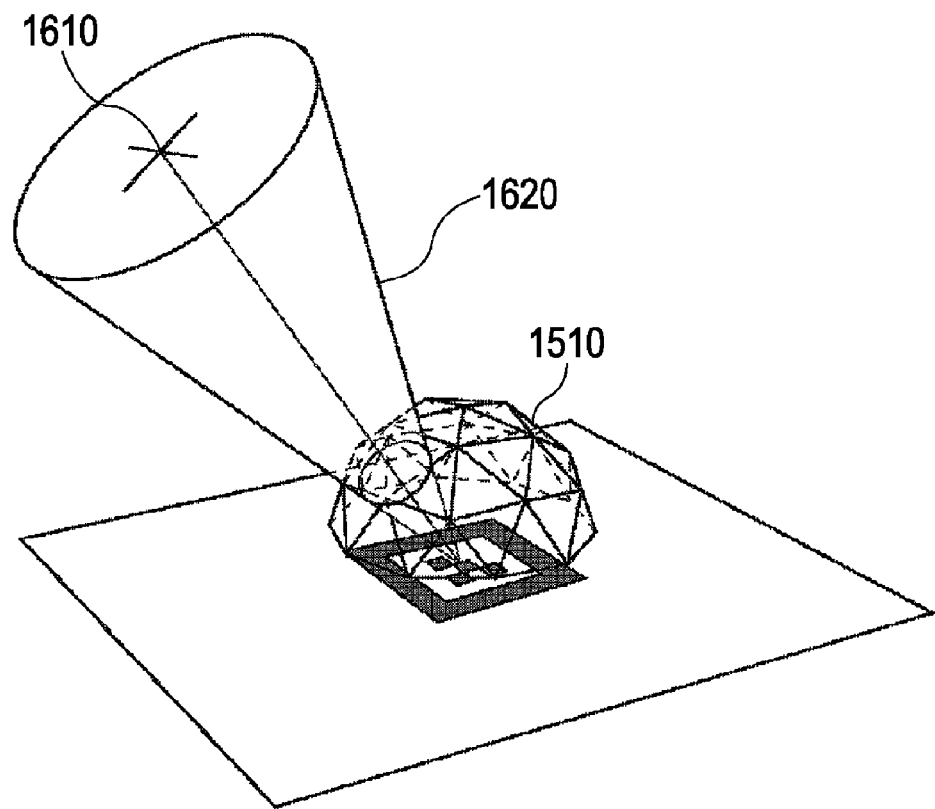
FIG. 16 illustrates a method of calculating the number of times at which each face of a three-dimensional object has been captured.
Figure 17:
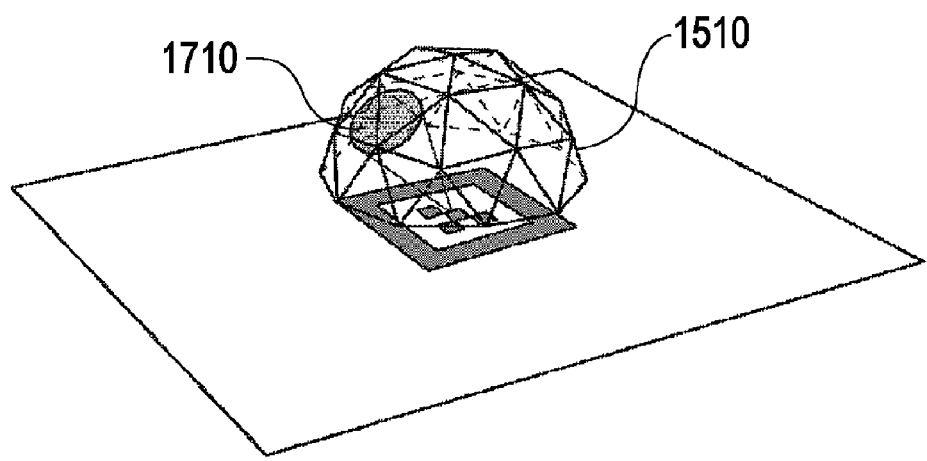
FIG. 17 illustrates the method of calculating the number of times at which each face of the three-dimensional object has been captured.
Figure 18:
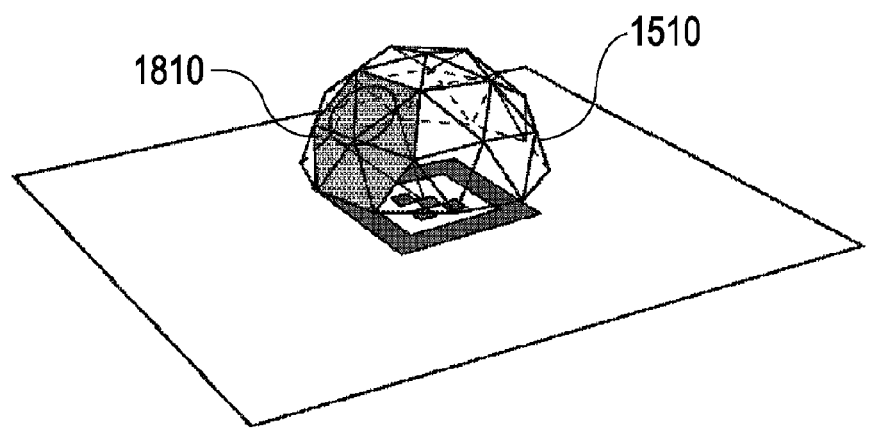
FIG. 18 illustrates the method of calculating the number of times at which each face of the three-dimensional object has been captured.

The three-dimensional image capturing direction of the marker, the image capturing distance thereof, and the number of times of the image capturing corresponding to the three-dimensional image capturing direction of the marker are decided, by way of example, as follows. FIGS. 16-18 illustrate the number of times of the image capturing of the object face. The processing described below is executed for each data set obtained as the identification result.

First, the analyzing section 1460 refers to the identification result stored in the data storage section 1450 and obtains a position 1610 at which an image is captured by the video camera. At that time, the direction of a vector extending from the central point of the marker to the image capturing position 1610 is assumed to be the three-dimensional image capturing direction, and the length of the vector is assumed to be the image capturing distance. The three-dimensional image capturing direction and distance are stored in the analyzing section 1460. Thereafter, a cone 1620 is produced in which the center of a circular bottom surface of the cone is defined by the image capturing position 1610 and the zenith of the cone is defined by the central point of the marker. On that occasion, the radius of the circular bottom surface of the cone can be set to a fixed numerical value in advance, or can be changed depending on the image capturing distance or the field angle of the video camera.

Next, as shown in FIG. 17, a region 1710 in which the cone 1620 and the three-dimensional object 1510 overlap with each other is determined by the known cross-point calculation method. Further, the count number of times of the image capturing for each of faces 1810 of the three-dimensional object 1510, which overlap with the region 1710 as shown in FIG. 18, is incremented by one. The count number for each face is stored in the analyzing section 1460.

The marker detection accuracy 1520 represents estimated accuracy for the relative position and posture of the video camera at the time when the marker is detected from the captured image. The estimated accuracy for the relative position and posture of the video camera is determined, for example, by a method which is obtained by extending the method described in Lowe to the three-dimensional direction. More specifically, the image of each marker is first captured from a plurality of known relative positions and postures of the video camera, taking into account the three-dimensional direction beforehand in which the marker image is possibly captured. Further, an accuracy score based on an error between the relative position and posture of the video camera, which are obtained from the marker, and the known relative position and posture thereof is stored in the form of a table for each of the three-dimensional directions and each value of the distance. The accuracy score is calculated, for example, as a ratio of (preset allowable error/measured error). The table is stored in the analyzing section 1460 beforehand.

Further, the marker detection accuracy 1520 is determined, by way of example, as follows. First, the analyzing section 1460 refers to the estimated accuracy table for the relative position and posture of the video camera based on the three-dimensional image capturing directions and distances at which the images have been captured up to that time. Next, of the accuracy scores for the three-dimensional image capturing directions and distances, two values of the first and second highest accuracy scores are averaged and the averaged value is set as the marker detection accuracy 1520. When the marker is not identified, the marker detection accuracy 1520 is set to 0, and when the marker is identified only one time, a half the obtained accuracy score is set as the marker detection accuracy 1520.

According to the fourth exemplary embodiment, as described above, the analyzing section 1460 first calculates the three-dimensional image capturing direction, the image capturing distance, the number of times of the image capturing corresponding to the three-dimensional image capturing direction, and the marker detection accuracy 1520 for each of the identified markers. Then, the display section 1470 displays the three-dimensional object 1510 and the marker detection accuracy 1520 based on the analysis result. With that processing, the user can determine whether the image is to be captured in the relevant direction, based on a relatively simple determination criterion, i.e., a colored area on the screen and a numerical value of the marker detection accuracy 1520.

Modification 4-1

Figure 19:
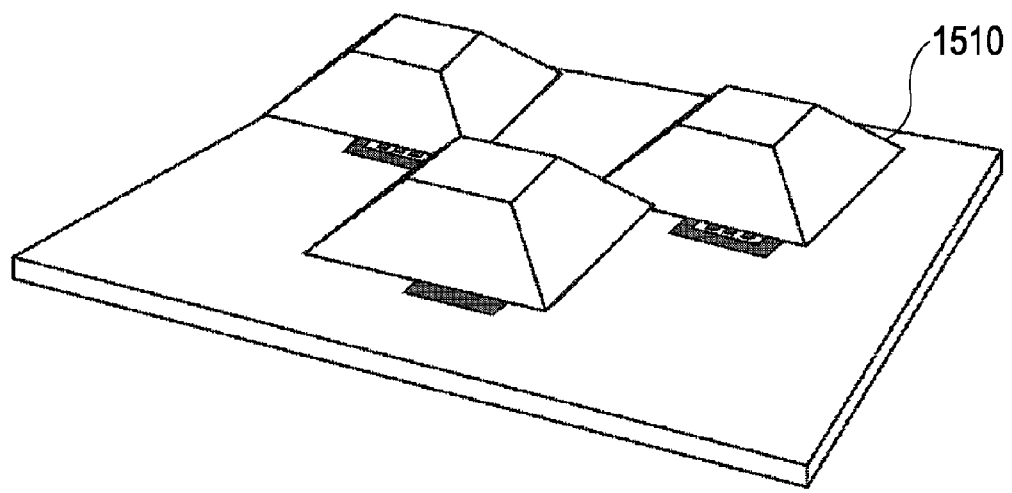
FIG. 19 illustrates an information presenting method according to Modification 4-1.
Figure 20:
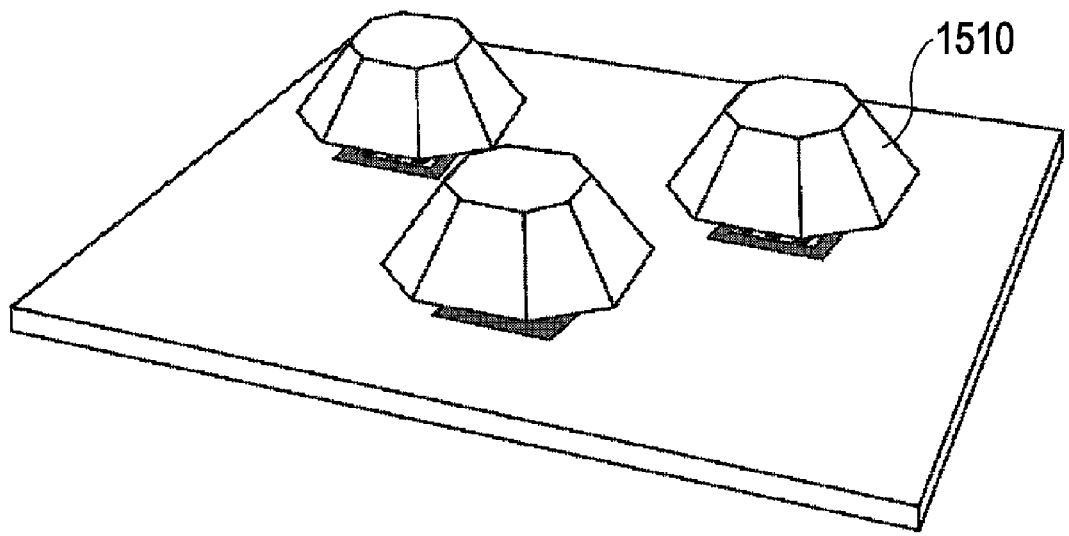
FIG. 20 illustrates the information presenting method according to Modification 4-1.

The present invention is not limited to the use of a geodesic dome as the three-dimensional object 1510 as in the fourth exemplary embodiment, and the three-dimensional object 1510 can also be practiced in any of other suitable three-dimensional shapes so long as it is able to represent the three-dimensional image capturing direction of the marker. For example, as shown in FIG. 19, a quadrangular truncated pyramid can be used as the three-dimensional object 1510. Alternatively, as shown in FIG. 20, a decagonal truncated pyramid can also be used as the three-dimensional object 1510.

In this modification, the functional configuration and the processing steps of the marker arrangement information measuring apparatus are basically the same as those in the fourth exemplary embodiment except for the shape of the three-dimensional object 1510. Therefore, a description thereof is not repeated here.

Modification 4-2

In the fourth exemplary embodiment, the color of the face of the three-dimensional object is decided depending on the three-dimensional image capturing direction of the marker and the number of times of the image capturing thereof. However, the method of representing the image capturing information in the present invention is not limited to the method of changing the color of the face of the three-dimensional object. For example, the image capturing information can also be represented by changing the position of the face of the three-dimensional object 1510.

Figure 21:
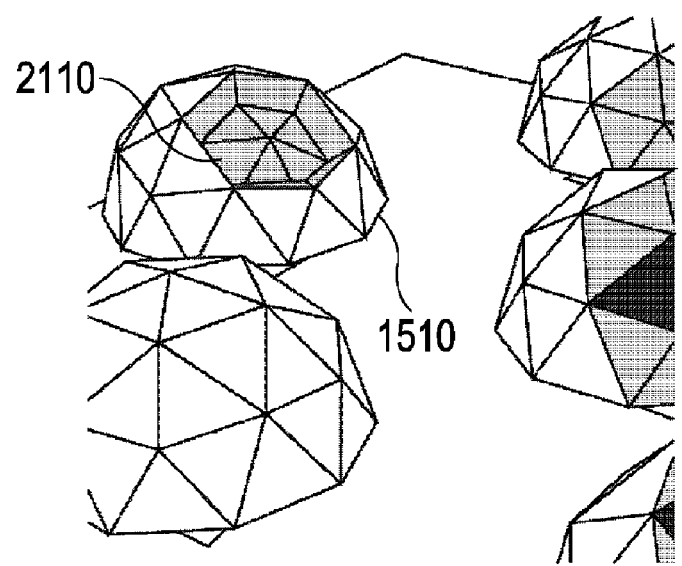
FIG. 21 illustrates an information presenting method according to Modification 4-2.

In this modification, in addition to changing the color of the face of the three-dimensional object 1510 as in the fourth exemplary embodiment, the face of the three-dimensional object 1510 is scaled down in the direction toward the center of the hemisphere depending on the three-dimensional image capturing direction and distance at the time of the image capturing, as shown in FIG. 21. By thus changing the shape of the three-dimensional object 1510 when it is displayed, the information regarding the distance at the time of the image capturing can be presented to the user.

In this modification, the functional configuration of the marker arrangement information measuring apparatus differs only in the processing executed by the display section 1470 as compared with that of the marker arrangement information measuring apparatus according to the fourth exemplary embodiment.

The display section 1470 in this modification decides the color and the level in depth from the object surface for each face of the three-dimensional object 1510 based on the analysis result obtained by the analyzing section 1460, and then displays the three-dimensional object 1510 depending on the marker arrangement information.

In this modification, the processing steps of the marker arrangement information measuring apparatus differ only in the process of presenting the information in step S1130 as compared with those in the fourth exemplary embodiment.

In step S1130, in addition to the processing executed in the fourth exemplary embodiment, the display section 1470 decides the shape of the three-dimensional object 1510 based on the analysis result. Further, the display section 1470 executes the following processing for each face of the three-dimensional object 1510. First, the display section 1470 refers to the image capturing distance obtained in the analysis result and determines in which one of ranges set in a preset distance table the image capturing distance falls. For example, four ranges corresponding to 100%, 75%, 50% and 25% are prepared in the distance table. The face of the three-dimensional object 1510 is scaled down at a scale-down rate set corresponding to the relevant distance. In a scaling-down process, as denoted by 2110 in FIG. 21, the face of the three-dimensional object 1510 is scaled down with the central point of the hemisphere being a reference point for the scaling-down, and additional faces are produced so as to fill in the gaps caused due to the scaling-down of the relevant face. The faces produced to fill in the gaps are colored in the same color as that of the scaled-down face.

Modification 4-3

In the fourth exemplary embodiment, even when the marker is not detected, the three-dimensional object 1510 is displayed similarly to the detected marker if the following conditions are satisfied:

the arrangement information of the relevant marker in the reference coordinate system can be measured, and the past analysis result of the relevant marker is stored.

However, because the user cannot confirm the state of the marker being not detected, a difficulty occurs in efficiently obtaining information. Stated another way, even when the user inputs the instruction for capturing the image through the console 880, an image effective in calculating the marker arrangement information often cannot be obtained for the reason that the market is not detected. To avoid such a problem, the detected marker and the not-detected marker are required to be displayed in a separately discernable way.

Figure 22:
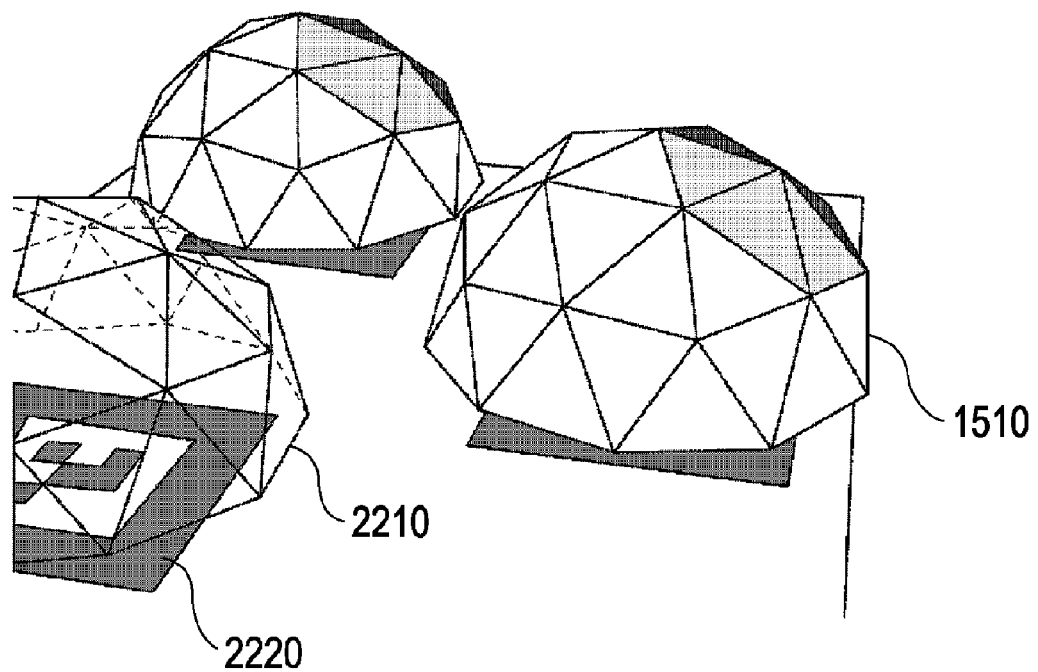
FIG. 22 illustrates an information presenting method according to Modification 4-3.

In this modification, transparency of the three-dimensional object 1510 is changed depending on the detected state of the marker so that the user can determine whether the current image is suitable for acquiring the marker arrangement information. FIG. 22 illustrates an example of display when this modification is applied. FIG. 22 shows a state where a marker 2220 at the left end extends out of the captured image and it is not recognized as a marker. In such a case, to discriminate the other recognized markers and the not-recognized marker 2220, a three-dimensional object 2210 representing the marker 2220 is presented to the user at low transparency. Note that, in the present invention, the method of displaying the recognized state of the marker in a separately discernable manner is not limited to the above-described one using transparency. Any of other suitable methods can also be used so long as it enables the recognized state of the marker to be separately discernable on the image by changing the color, e.g., brightness of the entire three-dimensional object, or the shape thereof.

In this modification, the functional configuration and the image processing steps are similar to those in the fourth exemplary embodiment except for the processing of step S1130 executed by the display section 1470. In step S1130, the display section 1470 forms an identifier list of the markers, which are detected at the current time, based on the identification results of the current image. Then, the display section 1470 draws the three-dimensional object 1510 depending on the analysis result. More specifically, the display section 1470 obtains the identifier of each marker from the analysis result. If the identifier of the relevant marker is not included in the identifier list of the detected markers, the display section 1470 draws the three-dimensional object 1510 representing the relevant marker at higher transparency.

With that processing, the user can separately recognize the marker detected at the current time and the marker not yet detected from each other, and can efficiently continue the image capturing that is requited to obtain the marker arrangement information.

Modification 4-4

In the fourth exemplary embodiment, the three-dimensional object 1510 reflecting the image capturing information is displayed on the image to aid the user in determining whether the image captured at the current time is to be acquired.

The method of aiding the user in making determination as to the image capturing in the present invention is not limited to the above-described one requiring the user to actively look at the color information of the three-dimensional object 1510. For example, the marker arrangement information measuring apparatus can automatically determine the color information of the three-dimensional object 1510 displayed on the image and provide information indicating the determination result to the user.

In this modification, the functional configuration and the processing steps are similar to those in the fourth exemplary embodiment. The difference between this modification and the fourth exemplary embodiment is that, after producing the image of the three-dimensional object 1510 in the processing of step S1130, the display section 1470 executes statistical processing of the colors in the image and provides an indication for prompting the user to instruct the image acquisition. The statistical processing of the colors in the image can be executed, for example, as a step of obtaining histograms of the image colors.

The indication for prompting the user to instruct the image acquisition can be provided, for example, by displaying a character train "Capture Image" on the image when, in the histograms of the image colors obtained by the above-described statistical processing, pixels occupied by a white area are three or more times those occupied by an area in other colors.

The method of prompting the user to instruct the image acquisition in the present invention is not limited to the above-described one using the character train for the prompting indication. The present invention can also be practiced by using any of other suitable methods, such as changing the color and/or the shape of the three-dimensional object 1510, so long as it enables the user to easily make the determination based on the presented image.

Modification 4-5

In Modification 4-4, the indication for prompting the user to instruct the image acquisition is displayed based on frequency distribution of the colors in the produced image of the three-dimensional object 1510. However, the present invention is not limited to the above-described method of displaying the indication for prompting the user to instruct the image acquisition. For example, the marker arrangement information measuring apparatus can automatically make the determination from the result of the statistical processing of the image colors to acquire the image. Stated another way, the display section 1470 can execute statistical processing of the image of the three-dimensional object 1510 and output the image acquisition instruction through the console 880 in accordance with the processing result.

Modification 4-6

In the fourth exemplary embodiment, the analyzing section 1460 analyzes the images which have been captured in the past, and presents the three-dimensional object 1510 and the marker detection accuracy 1520 based on the analysis result.

However, the present invention is not limited to the process of analyzing the images which have been captured in the past. The analyzing section 1460 can also analyze the marker identified in the image which is captured at the current time, and successively updates the three-dimensional object 1510 and the marker detection accuracy 1520 in real time.

This modification represents the case where the analyzing process is executed on the marker identified in the image which is captured at the current time.

In this modification, the functional configuration of the marker arrangement information measuring apparatus is similar to that in the fourth exemplary embodiment. The following description is made of only the difference between this modification and the fourth exemplary embodiment.

The data managing section 1440 stores the marker identification result obtained by the marker identifying section 830 in the data storage section 1450 regardless of an instruction entered through the console 880.

After determining that the image acquisition instruction is not entered through the console 880, the analyzing section 1460 receives the identification result additionally stored in the data storage section 1450 and produces a tentative analysis result. The tentative analysis result is data obtained by copying the analysis result held in the analyzing section 1460 and reflecting the newly input identification result on the copied analysis result. The tentative analysis result is stored separately from the ordinary analysis result. When the new identification result is received next, the tentative analysis result is erased. When the image acquisition instruction is entered through the console 880, the ordinary analysis result is stored.

Figure 23:
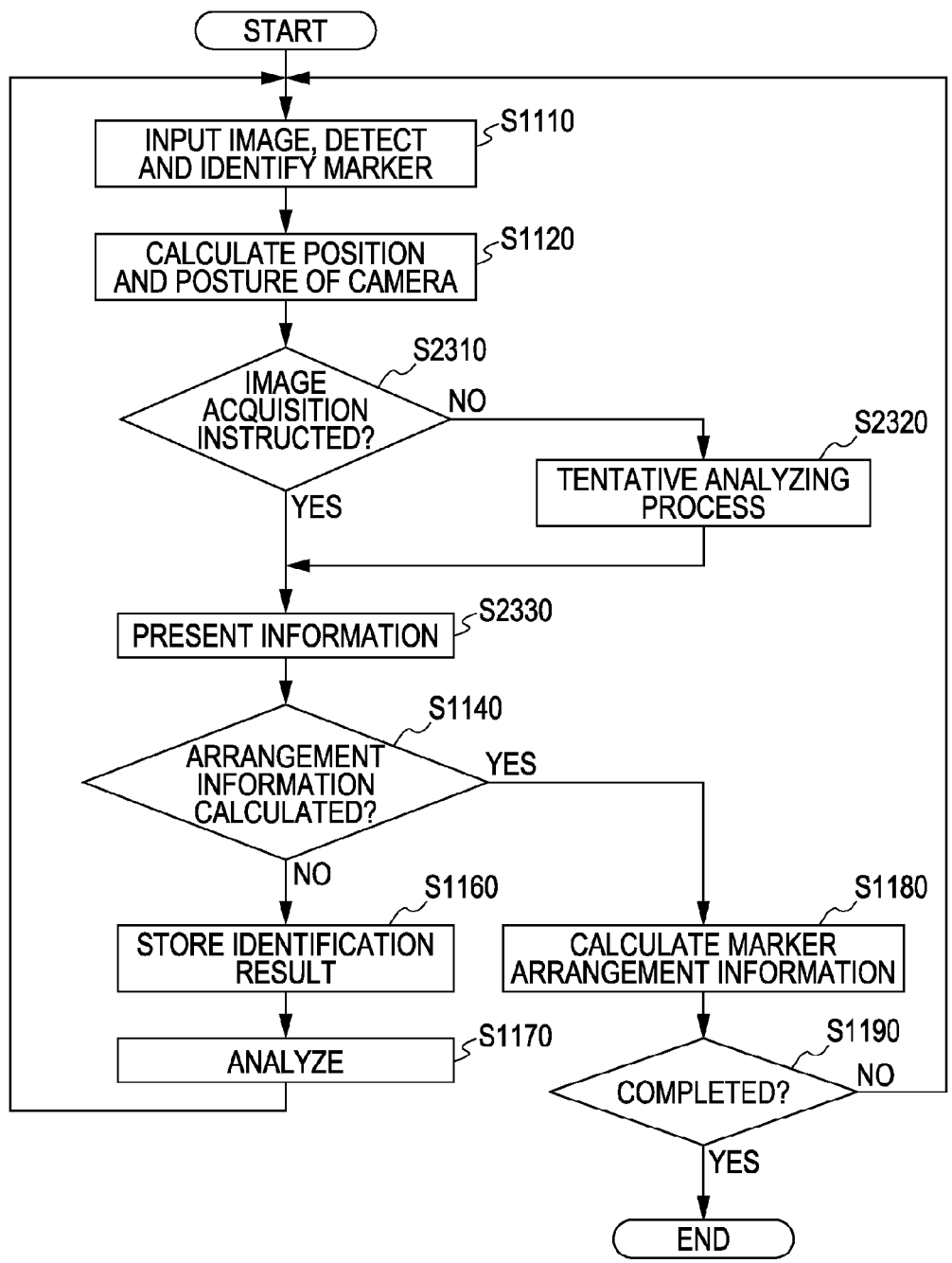
FIG. 23 is a flowchart of processing steps of a marker arrangement information measuring method according to Modification 4-6.

FIG. 23 is a flowchart of processing steps of the marker arrangement information measuring apparatus according to this modification. The processing steps in this modification are similar to those in the fourth exemplary embodiment, and the following description is made of only the difference therebetween.

In step S2310, as in step S1150 in the fourth exemplary embodiment, it is determined whether the instruction for acquiring the image is input through the console 880. If the determination result indicates the input of the instruction, the processing flow advances to step S2330, otherwise, the processing flow advances to step S2320.

In step S2320, the analyzing section 1460 produces a tentative analysis result based on the identification result. The analyzing process is the same as that in step S1170 of the fourth exemplary embodiment except for the storage destination of analysis result data. Namely, the tentative analysis result is written in a memory area differing from that in which the ordinary analysis result is written.

In step S2330, the display section 1470 determines whether the image acquisition instruction is input through the console 880. If the image acquisition instruction is input, the display section 1470 draws the three-dimensional object 1510 based on the ordinary analysis result stored in the analyzing section 1460. If the image acquisition instruction is not input, the display section 1470 draws the three-dimensional object 1510 based on the tentative analysis result stored in the analyzing section 1460. The other processing is the same as that of step S1130 in the fourth exemplary embodiment.

In the marker arrangement information measuring apparatus according to this modification, as described above, the analyzing process is executed even for the image, which is captured at the current time, in a similar manner to the case where the image acquisition instruction is input, thus enabling the analysis result to be presented to the user. With that processing, the result obtained from the image which is captured at the current time is promptly fed back to the user through the presented image. In other words, since the analysis result can be presented to the user before the user issues the image acquisition instruction and determines a failure of the image acquisition, it is possible to efficiently acquire the image.

The present invention is not limited to the above-described method of always executing the tentative analyzing process to display the tentative analysis result whenever the image acquisition instruction is not input. For example, the tentative analysis result can be displayed only when the user inputs an instruction for displaying the result of the tentative analyzing process through the condole 880.

Other Modifications

In the above-described exemplary embodiments, when the markers arranged on the scene or the object are each calibrated, i.e., when the position and the posture of each marker is measured, the information regarding the number of times of the image capturing of the marker in the past and the image capturing directions of the marker, as well as the reference coordinate system are presented to the user. However, the present invention is not limited to the calibration of the marker, and it can also be applied to the case of calibrating other information by using markers.

For example, when calibration of a magnetic position and posture sensor having 6 degrees of freedom (e.g., the position and the posture of a transmitter with respect to the reference coordinate system, and the position and the posture of a receiver with respect to the coordinate system of a measurement target (e.g., a camera)) is executed based on images capturing markers arranged in a space, the above-described exemplary embodiments can be applied such that the user can decide the marker and the direction for which the image is to be next captured, while receiving the information regarding the number of times of the image capturing and the image capturing directions for each of the markers.

The present invention can also be practiced by supplying program code (software) for implementing the functions of the above-described exemplary embodiments to a computer (CPU or MPU) in a system or an apparatus, which is connected to various devices for operate them so as to implement the functions of the above-described exemplary embodiments, and by operating the various devices in accordance with programs stored in the computer in the system or the apparatus.

In that case, the program code (software) serves=to implement the functions of the above-described exemplary embodiments.

Storage media for supplying the program code can be, e.g., a floppy disk, a hard disk, an optical disk, a magneto-optical disk, a CD-ROM, a magnetic tape, a nonvolatile memory card, and a ROM.

Further, the present invention involves not only the case where the functions of the above-described exemplary embodiments are implemented by the computer executing the supplied program code, but also the case where the functions of the above-described exemplary embodiments are implemented by the supplied program code in cooperation with an OS (operating system) running in the computer, other application software, and so on.

In addition, the supplied code read can be written in a memory which is provided in a function extension board inserted in the computer or in a function extension unit connected to the computer, and a part or the whole of the actual processing can be executed by a CPU or the like, which is incorporated in the function extension board or the function extension unit, in accordance with commands from the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2006-219845 filed Aug. 11, 2006 and No. 2007-131573 filed May 17, 2007, which are hereby incorporated by reference herein in their entirety.

What is claimed is:

1. A marker arrangement information measuring apparatus comprising:
    an image acquiring unit configured to acquire an image captured by an image pickup apparatus;
    a marker detecting unit configured to detect markers from the captured image;
    a marker identifying unit configured to identify the markers detected by the marker detecting unit;
    a storage unit configured to store a capturing history of each marker in a plurality of images previously captured by the image pickup apparatus;
    an updating unit configured to update the capturing history of each marker stored in the storage unit based on an identification result of the marker identifying unit;
    a display unit configured to display the captured image and information representing the capturing history of each marker updated by the updating unit in a combined manner; and
    an arrangement information calculating unit configured to calculate arrangement information of each marker based on the identification result of the marker identifying unit, wherein the display unit comprises:
a producing unit configured to produce an image corresponding to the capturing history based on a position and a posture of the image pickup apparatus; and
a combining unit configured to combine the produced image corresponding to the capturing the history with the captured image,
wherein the combining unit three-dimensionally combines the image corresponding to the capturing history.

2. The marker arrangement information measuring apparatus according to claim 1, further comprising a position and posture calculating unit configured to calculate a position and a posture of the image pickup apparatus at the time of capturing of the image.

3. The marker arrangement information measuring apparatus according to claim 1, wherein:
the updating unit updates the number of times of the image capturing of each marker as the capturing history of each marker; and
the display unit displays information representing the number of times of the image capturing in correspondence to each marker.

4. The marker arrangement information measuring apparatus according to claim 1, wherein:
the updating unit updates at least one of an image capturing direction, an image capturing distance, and an image capturing position of each marker as the capturing history of each marker based on a position and a posture of the image pickup apparatus; and
the display unit displays information representing the at least one of the image capturing direction, the image capturing distance, and the image capturing position.

5. The marker arrangement information measuring apparatus according to claim 1, wherein the display unit displays an image representing a relative relationship among the markers on the captured image in a combined manner.

6. The marker arrangement information measuring apparatus according to claim 1, further comprising:
a setting unit configured to set a reference marker having known arrangement information in a reference coordinate system; and
an analyzing unit configured to analyze, based on identification information of the reference marker, whether the arrangement information of the marker in the reference coordinate system can be calculated,
wherein the display unit displays an image representing the reference coordinate system on the captured image in a combined manner when the arrangement information of the marker in the reference coordinate system can be calculated.

7. The marker arrangement information measuring apparatus according to claim 1, wherein:
the updating unit calculates, from a currently captured image, a tentative capturing history for each marker identified by the marker identifying unit; and
the display unit displays information based on the tentative capturing history.

8. The marker arrangement information measuring apparatus according to claim 1, wherein the display unit displays the capturing history of the updating unit on the same projected plane as the captured image.

9. The marker arrangement information measuring apparatus according to claim 1, wherein the display unit displays the capturing history of the updating unit on the same plane as a plane on which the corresponding marker is arranged.

10. The marker arrangement information measuring apparatus according to claim 1, wherein the display unit displays, based on the capturing history of the updating unit, information made correspondent to a three-dimensional shape representing a three-dimensional direction in which each marker is observed.

11. The marker arrangement information measuring apparatus according to claim 10, wherein a part or the whole of a surface of the three-dimensional shape representing the three-dimensional direction has a color changed depending on the capturing history of the updating unit.

12. The marker arrangement information measuring apparatus according to claim 10, wherein the three-dimensional shape representing the three-dimensional direction is changed depending on the capturing history of the updating unit.

13. The marker arrangement information measuring apparatus according to claim 1, wherein the updating unit updates at least one of an image capturing direction, an image capturing distance, an image capturing position, the number of times of the image capturing, and the marker identification result of the corresponding marker.

14. The marker arrangement information measuring apparatus according to claim 1, wherein the display unit displays, based on the image presented corresponding to the capturing history of the updating unit, an indication for prompting a user to acquire the captured image.

15. The marker arrangement information measuring apparatus according to claim 1, wherein the display unit automatically acquires the captured image based on the image presented corresponding to the capturing history of the updating unit.

16. The marker arrangement information measuring apparatus according to claim 1, wherein the updating unit calculates marker detection reliability based on at least one item of information regarding an image capturing direction, an image capturing distance, and an image capturing position of each marker, decides the capturing history based on the calculated detection reliability, and displays the decided capturing history on the display unit.

17. A marker arrangement information measuring method comprising:
acquiring an image captured by an image pickup unit;
detecting markers from the captured image;
identifying the detected markers;
updating a capturing history of each marker in a plurality of images previously captured by the image pickup apparatus based on an identification result of the detected markers;
displaying, in display unit, the captured image with information representing the updated capturing history of each marker in a superimposed manner; and
calculating arrangement information of each marker based on the identification result of the detected markers,
wherein the displaying step comprises:
producing an image corresponding to the capturing history based on a position and a posture of the image pickup unit; and
combining the produced image corresponding to the capturing history with the captured image,
wherein the combining step includes three-dimensionally combining the image corresponding to the capturing history.

* * * * *